(12) United States Patent
Wang et al.

(10) Patent No.: US 11,049,323 B2
(45) Date of Patent: Jun. 29, 2021

(54) METHOD AND APPARATUS FOR DERIVING VR PROJECTION, PACKING, ROI AND VIEWPORT RELATED TRACKS IN ISOBMFF AND SUPPORTING VIEWPORT ROLL SIGNALING

(71) Applicant: MEDIATEK INC., Hsin-Chu (TW)

(72) Inventors: Xin Wang, San Jose, CA (US); Lulin Chen, San Jose, CA (US); Wang Lin Lai, San Jose, CA (US)

(73) Assignee: MediaTek Inc., Hsin-Chu (TW)

( * ) Notice: Subject to any disclaimer, the term of this patent is extended or adjusted under 35 U.S.C. 154(b) by 0 days.

(21) Appl. No.: 16/496,954

(22) PCT Filed: Mar. 23, 2018

(86) PCT No.: PCT/CN2018/080338
§ 371 (c)(1),
(2) Date: Sep. 23, 2019

(87) PCT Pub. No.: WO2018/171758
PCT Pub. Date: Sep. 27, 2018

(65) Prior Publication Data
US 2020/0105063 A1    Apr. 2, 2020

Related U.S. Application Data

(60) Provisional application No. 62/478,062, filed on Mar. 29, 2017, provisional application No. 62/476,939, (Continued)

(51) Int. Cl.
*G06F 3/01* (2006.01)
*H04N 19/17* (2014.01)
(Continued)

(52) U.S. Cl.
CPC ........ *G06T 19/006* (2013.01); *G02B 27/0172* (2013.01); *G06F 3/011* (2013.01);
(Continued)

(58) Field of Classification Search
None
See application file for complete search history.

(56) References Cited

U.S. PATENT DOCUMENTS

| 2016/0381398 | A1  | 12/2016 | Saxena |
| 2017/0085917 | A1  | 3/2017  | Hannuksela |
| 2018/0075635 | A1* | 3/2018  | Choi .................. H04N 5/23238 |

FOREIGN PATENT DOCUMENTS

| CN | 102484731  A  | 5/2012 |
| CN | 106331732  A  | 1/2017 |
| WO | 2016/181202 A1 | 11/2016 |

OTHER PUBLICATIONS

"International Search Report" dated May 25, 2018 for International application No. PCT/CN2018/080338, International filed:Mar. 23, 2018.
(Continued)

*Primary Examiner* — Tapas Mazumder
(74) *Attorney, Agent, or Firm* — Wolf, Greenfield & Sacks, P.C.

(57) ABSTRACT

A video processing method includes receiving a virtual reality (VR) content, obtaining a picture from the VR content, encoding the picture to generate a part of a coded bitstream, and encapsulating the part of the coded bitstream into ISO Base Media File Format (ISOBMFF) file(s). In one exemplary implementation, the ISOBMFF file(s) may include a transform property item that is set to enable at least one of a projection transformation, a packing transformation, a VR viewport selection, and a VR region of interest (ROI) selection in track derivation. In another exemplary implementation, the ISOBMFF file(s) may include a first
(Continued)

parameter, a second parameter, and a third parameter associated with orientation of a viewport, with the first, second and third parameters indicating a yaw angle, a pitch angle and a roll angle of a center of the viewport, respectively. Further, an associated video processing apparatus is provided.

15 Claims, 20 Drawing Sheets

Related U.S. Application Data filed on Mar. 27, 2017, provisional application No. 62/475,944, filed on Mar. 24, 2017.

(51) Int. Cl.
| | | |
|---|---|---|
| G06T 19/00 | (2011.01) | |
| H04N 19/172 | (2014.01) | |
| H04N 19/167 | (2014.01) | |
| H04N 21/4728 | (2011.01) | |
| G02B 27/01 | (2006.01) | |
| G06K 9/00 | (2006.01) | |
| G06T 7/70 | (2017.01) | |
| H04N 19/513 | (2014.01) | |

(52) U.S. Cl.
CPC ............ *G06K 9/00671* (2013.01); *G06T 7/70* (2017.01); *H04N 19/167* (2014.11); *H04N 19/172* (2014.11); *H04N 19/513* (2014.11); *H04N 21/4728* (2013.01); *H04N 2213/003* (2013.01)

(56) References Cited

OTHER PUBLICATIONS

R. Skupin, Y. Sanchez, C. Hellge, and T. Schierl, "Tile based hevc video for head mounted displays," in IEEE Int. Symp. Multimedia (ISM'16), Dec. 2016, pp. 399-400.

"ISO/IEC 14496-12: Information technology Coding of audio-visual objects Part 12: ISO base media file format," Fifth edition, Feb. 2015. pp. 1-243.

* cited by examiner

| Shape | View ($\iota$) | Image illustration |
|---|---|---|
| 0 | Point: at translation (x, y, z) and orientation (pitch, yaw, roll) | • |
| 1 | Rectangle: $\iota^{(R)} = (w, h)$<br>where w = width, and h = height of the rectangle | 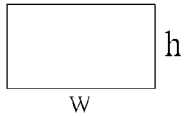 |
| 2 | Triangle: $\iota^{(T)} = (w, h, r)$<br>where w = width, h = height, and r = rotation (or orientation) of the triangle | r = 0<br>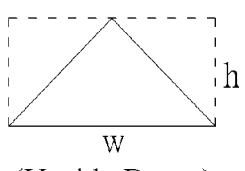<br>r = 1 (Upside Down):<br>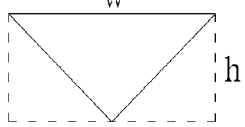<br>r = 2 (Upside Left):<br>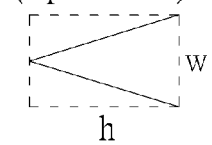<br>r = 3 (Upside Right):<br>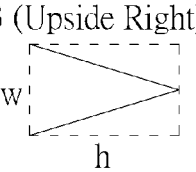 |
| 3 | Square: $\iota^{(S)} = d$<br>where d = size of the square | 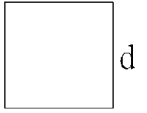 |
| 4 | Circle: $\iota^{(C)} = r$<br>where r = radius of the circle | 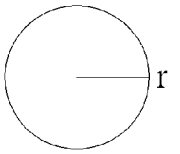 |

FIG. 20

METHOD AND APPARATUS FOR DERIVING VR PROJECTION, PACKING, ROI AND VIEWPORT RELATED TRACKS IN ISOBMFF AND SUPPORTING VIEWPORT ROLL SIGNALING

CROSS REFERENCE TO RELATED APPLICATIONS

This application is a national stage filing under 35 U.S.C. § 371 of International Patent Application Serial No. PCT/CN2018/080338, filed Mar. 23, 2018, which claims priority to U.S. provisional application No. 62/475,944, filed Mar. 24, 2017, U.S. provisional application No. 62/476,939 filed Mar. 27, 2017, and U.S. provisional application No. 62/478,062, filed Mar. 29, 2017. The entire contents of the related applications, including U.S. provisional application No. 62/475,944, U.S. provisional application No. 62/476,939 and U.S. provisional application No. 62/478,062, are incorporated herein by reference.

TECHNICAL FIELD

The present invention relates to processing virtual reality (VR) content, and more particularly, to a method and an apparatus for deriving VR projection, packing (mapping), ROI and viewport related tracks in the ISO Base Media File Format (ISOBMFF) and supporting viewport roll signaling.

BACKGROUND

Virtual reality (VR) has lately gained significant attention primarily driven by the recent market availability of consumer devices, such as head-mounted displays (HMDs). VR with HMDs is associated with a variety of applications. The ability to show wide field of view content to a user can be used to provide immersive visual experiences. A real-world environment has to be captured in all directions, resulting in an omnidirectional VR content. With advances in camera rigs and HMDs, the delivery of omnidirectional VR content may soon become the bottleneck due to the high bitrate required for representing such 360° content.

In recent years, there have been a lot of activities around VR as evidenced by large industry engagement. For example, due to expecting that the increasing popularity of consumer VR HMDs will lead to an increased demand for VR content, various companies have also started to develop omnidirectional cameras to allow capturing of 360° content. However, the lack of appropriate standards and, consequently, reduced interoperability is becoming an issue. Thus, Moving Picture Experts Group (MPEG) has started a project referred to as Omnidirectional Media Application Format (OMAF) that aims at standardizing a storage and delivery format for 360° audio-video content. In the context of OMAF, the storage and delivery format is based on the ISO base media file format (ISOBMFF). However, regarding the developing standard for VR content storage and delivery, there is much room for improvement.

SUMMARY

One of the objectives of the claimed invention is to provide a method and an apparatus for deriving VR projection, packing (mapping), ROI and viewport related tracks in the ISO Base Media File Format (ISOBMFF) and supporting viewport roll signaling.

According to a first aspect of the present invention, an exemplary video processing method is disclosed. The exemplary video processing method includes: receiving a virtual reality (VR) content; obtaining a picture from the VR content; encoding the picture to generate a part of a coded bitstream; and encapsulating, by a file encapsulation circuit, the part of the coded bitstream into at least one ISO Base Media File Format (ISOBMFF) file, wherein said at least one ISOBMFF file comprises a transform property item that instructs track derivation arranged to obtain a derived track from at least one visual track, and the transform property item is set to enable at least one of a projection transformation, a packing transformation, a VR viewport selection, and a VR region of interest (ROI) selection in the track derivation.

According to a second aspect of the present invention, an exemplary video processing method is disclosed. The exemplary video processing method includes: receiving a virtual reality (VR) content; obtaining a picture from the VR content; encoding the picture to generate a part of a coded bitstream; and encapsulating, by a file encapsulation circuit, the part of the coded bitstream into at least one ISO Base Media File Format (ISOBMFF) file, wherein said at least one ISOBMFF file comprises a first parameter, a second parameter, and a third parameter associated with orientation of a viewport, with the first, second and third parameters indicating a yaw angle, a pitch angle and a roll angle of a center of the viewport, respectively.

According to a third aspect of the present invention, an exemplary video processing method is disclosed. The exemplary video processing method includes: receiving at least one ISO Base Media File Format (ISOBMFF) file, wherein virtual reality (VR) content is delivered by said at least one ISOBMFF file, said at least one ISOBMFF file comprises a transform property item; decapsulating, by a file decapsulation circuit, said at least one ISOBMFF file into a part of a coded bitstream, wherein the transform property item is parsed from said at least one ISOBMFF file; decoding the part of the coded bitstream; obtaining at least one visual track according to a decoding result of the part of the coded bitstream; and obtaining a derived track from said at least one visual track by performing track derivation that is instructed by the transform property item, wherein the transform property item enables at least one of a projection transformation, a packing transformation, a VR viewport selection, and a VR region of interest (ROI) selection in the track derivation.

According to a fourth aspect of the present invention, an exemplary video processing method is disclosed. The exemplary video processing method includes: receiving at least one ISO Base Media File Format (ISOBMFF) file, wherein virtual reality (VR) content is delivered by said at least one ISOBMFF file, said at least one ISOBMFF file comprises a first parameter, a second parameter, and a third parameter associated with orientation of a viewport, with the first, second and third parameters indicating a yaw angle, a pitch angle and a roll angle of a center of the viewport, respectively; decapsulating said at least one ISOBMFF file into a part of a coded bitstream, wherein the first parameter, the second parameter, and the third parameter are parsed from said at least one ISOBMFF file; decoding the part of the coded bitstream to obtain decoded data of the viewport; and rendering and displaying the viewport on a display screen according to the decoded data of the viewport.

In addition, video processing apparatuses associated with the above video processing methods are provided.

BRIEF DESCRIPTION OF THE DRAWINGS

These and other objectives of the present invention will no doubt become obvious to those of ordinary skill in the art after reading the following detailed description of the preferred embodiment that is illustrated in the various figures and drawings.

FIG. 20 is a diagram illustrating viewport/ROI shapes and sizes according to an embodiment of the present invention.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
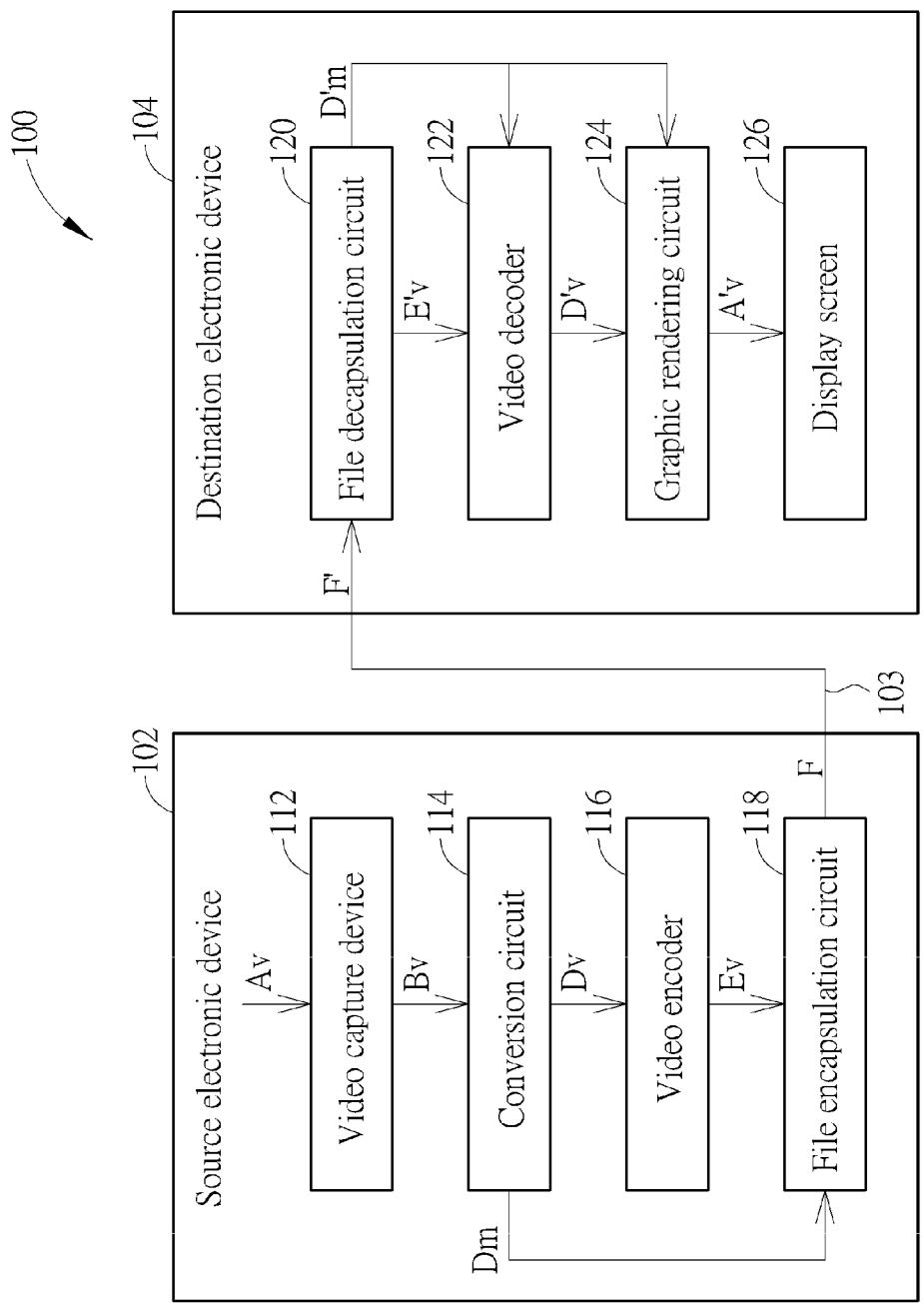
FIG. 1 is a diagram illustrating a Virtual Reality (VR) system according to an embodiment of the present invention.

FIG. 1 is a diagram illustrating a Virtual Reality (VR) system according to an embodiment of the present invention. The VR system 100 includes two video processing apparatuses (e.g., a source electronic device 102 and a destination electronic device 104). The source electronic device 102 includes a video capture device 112, a conversion circuit 114, a video encoder 116, and a file encapsulation circuit 118. The video capture device 112 is a VR content provider that provides a VR content (e.g., an omnidirectional VR content) Bv. For example, the video capture device 112 may be a set of cameras used to capture a scene Av in different directions, such that multiple captured images that cover the whole surroundings are generated by the video capture device 112. In some other embodiments, multiple captured images that cover the whole surroundings may be received from more than one source devices, more than one video capture device or a combination of at least one source device and at least one video capture device. In this embodiment, the video capture device 112 may be equipped with video stitching capability. Hence, the contents captured by different cameras of the video capture device 112 may be stitched together to form a stitched image. In addition, the stitched image may be further projected onto a three-dimensional (3D) projection structure (e.g., a sphere). Hence, the video capture device 112 can provide the VR content Bv on a sphere.

The conversion circuit 114 is coupled between the video capture device 112 and the video encoder 116. The conversion circuit 114 generates a picture Dv on a two-dimensional (2D) plane by applying visual pre-processing to the VR content Bv in a 3D space. When the VR content Bv corresponds to a sphere in the 3D space, the visual pre-processing performed at the conversion circuit 114 may include projection and optional region-wise packing. Hence, the picture Dv may be a projected picture or a packed picture. The VR content Bv on the 3D projection structure (e.g., sphere) may be further arranged onto a 2D projected picture via a 360° VR projection format. For example, the 360° VR projection format may be an equirectangular projection (ERP) format or a cubemap projection (CMP) format. Assuming that the optional region-wise packing is used, regions on the 2D projected picture are further mapped onto a 2D packed picture.

Figure 2:
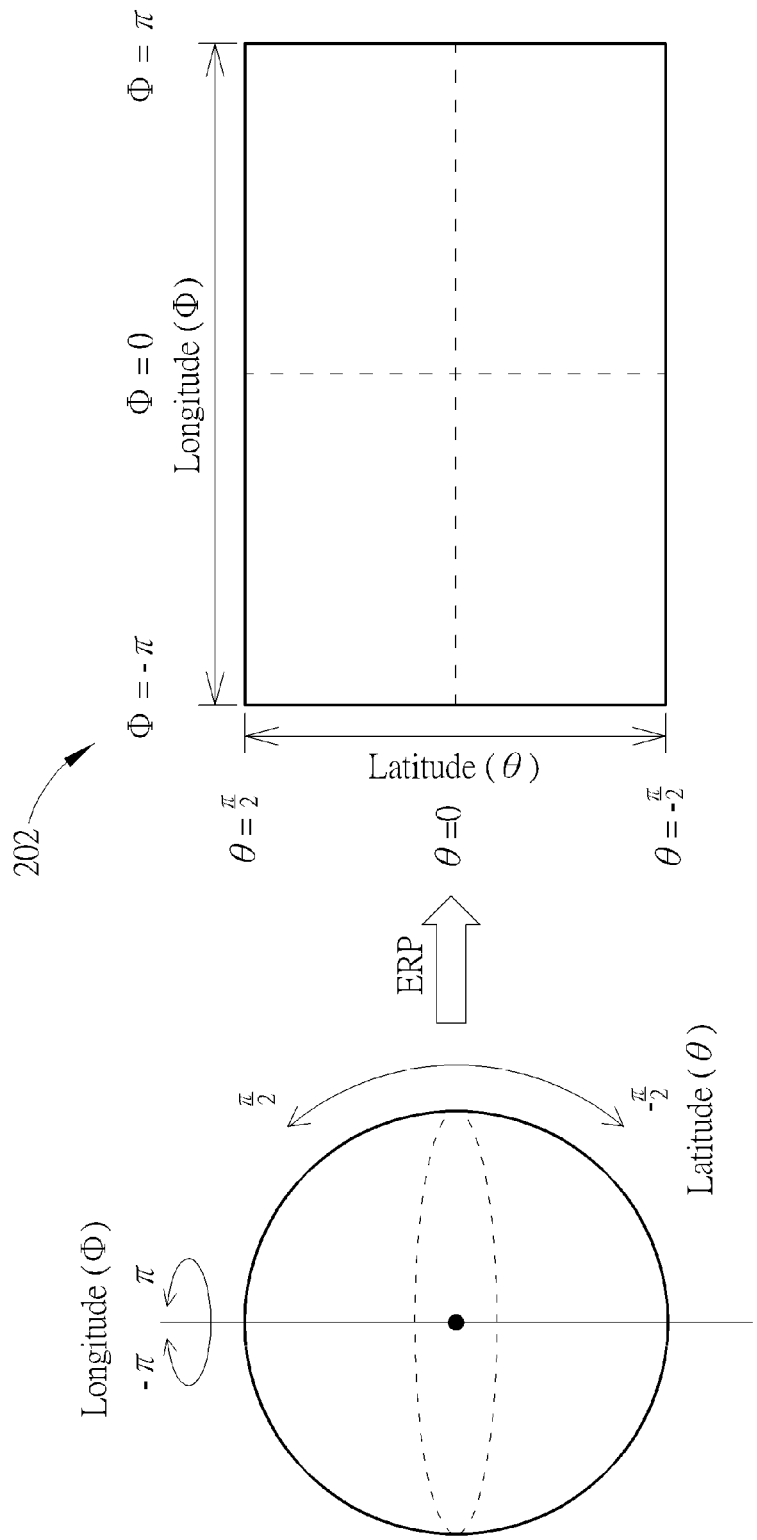
FIG. 2 is a diagram illustrating an equirectangular projection (ERP) according to an embodiment of the present invention.

FIG. 2 is a diagram illustrating an equirectangular projection (ERP) according to an embodiment of the present invention. The VR content Bv on the sphere 200 is projected onto a rectangular picture 202 on the 2D plane. The sphere 200 is sampled into several horizontal circles (circles of latitudes), and each of those is mapped to a horizontal line of the rectangular picture 202. The horizontal lines towards the upper and lower picture boundary are significantly stretched with respect to their respective circles on the sphere 200.

Figure 3:
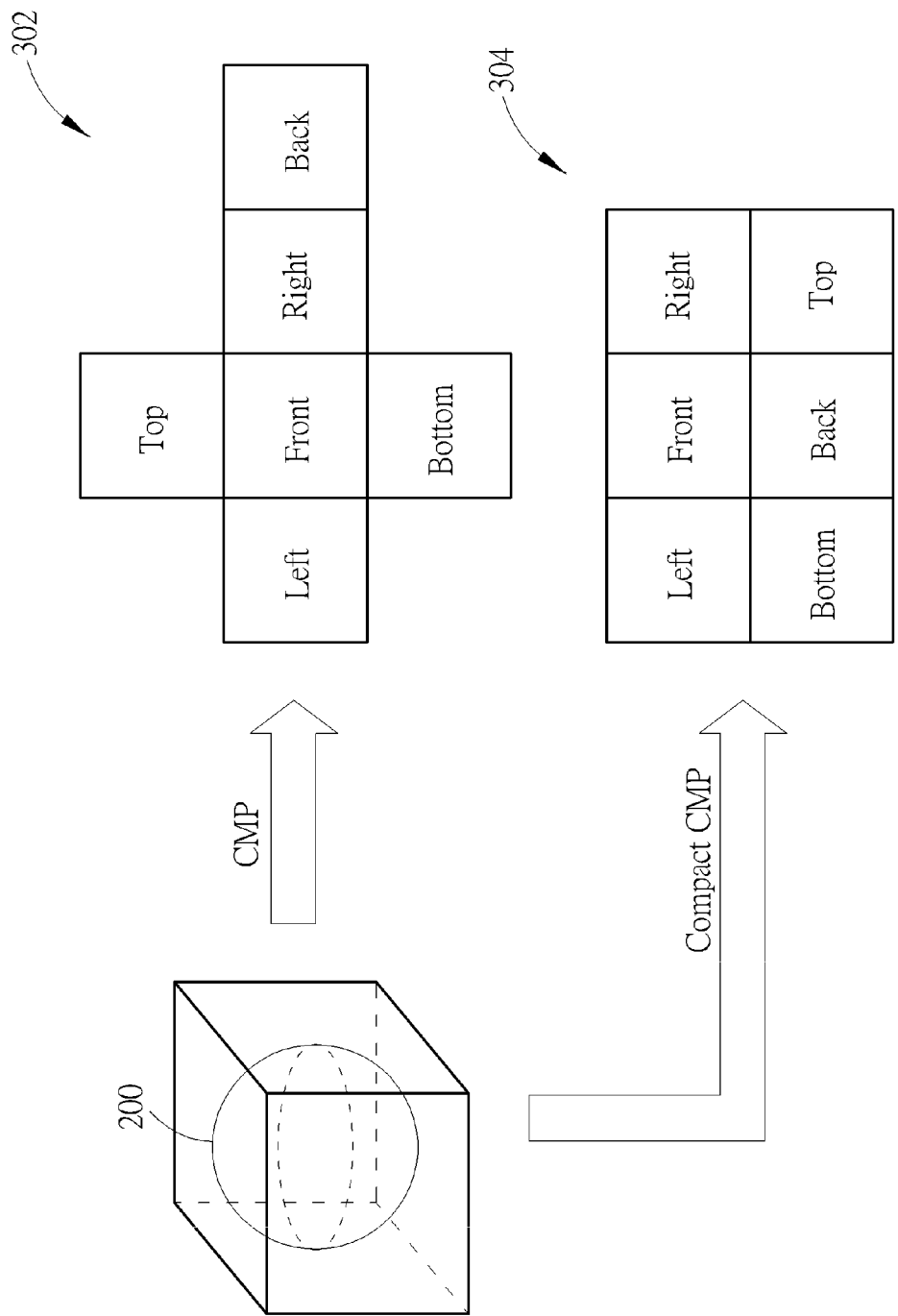
FIG. 3 is a diagram illustrating a cubemap projection (CMP) according to an embodiment of the present invention.

FIG. 3 is a diagram illustrating a cubemap projection (CMP) according to an embodiment of the present invention. The VR content Bv on the sphere 200 is projected onto six faces of a cube, including a top face (labeled by "Top"), a bottom face (labeled by "Bottom"), a left face (labeled by "Left"), a front face (labeled by "Front"), a right face (labeled by "Right"), and a back face (labeled by "Back"), and the faces are subsequently arranged on the 2D plane. The picture Dv to be encoded is required to be rectangular. If the CMP layout 302 is directly used for creating the picture Dv, the picture Dv is unable to have a compact layout due to many dummy areas (e.g., black areas, gray areas, or white areas) filled in the picture Dv. Alternatively, the picture Dv can have projected image data arranged in the compact CMP layout 304 to avoid using dummy areas (e.g., black areas, gray areas, or white areas).

Figure 4:
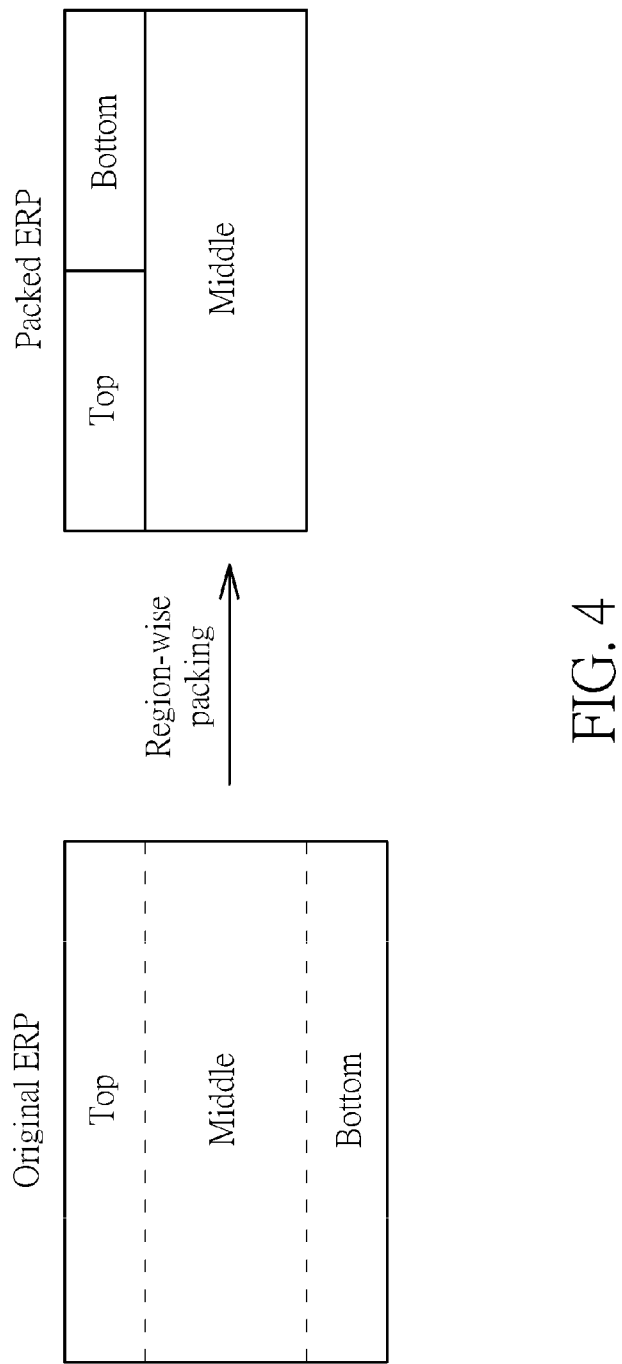
FIG. 4 is a diagram illustrating a first region-wise packing example according to an embodiment of the present invention.
Figure 5:
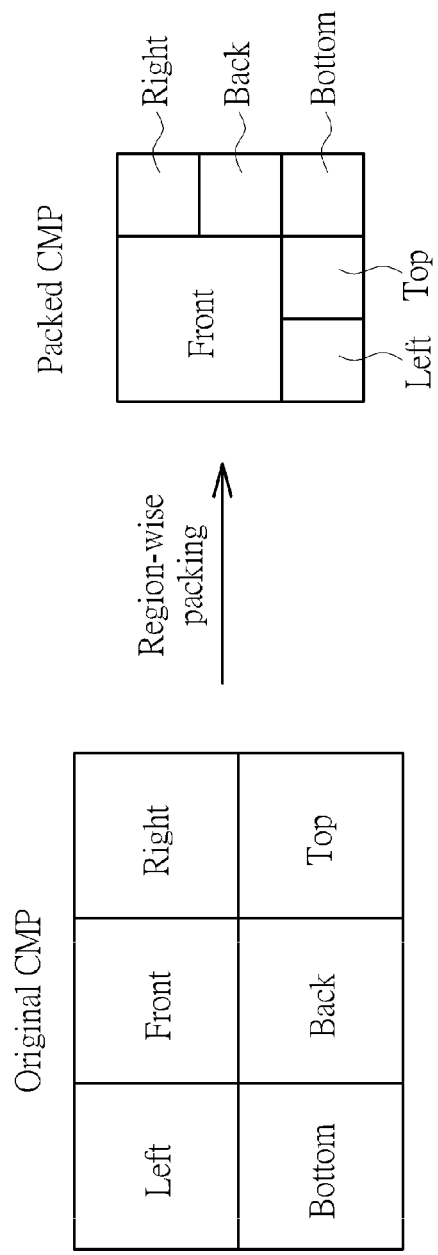
FIG. 5 is a diagram illustrating a second region-wise packing example according to an embodiment of the present invention.

The region-wise packing process may be applied to a projected picture with a particular projection layout (e.g., an ERP layout or a compact CMP layout) prior to encoding. For example, the projected picture is partitioned into a plurality of rectangular regions, and the region-wise packing is applied to the rectangular regions for packing the rectangular regions into a packed picture. Regarding a rectangular region of the projected picture, the region-wise packing may apply translation, scaling, rotation, and/or mirroring to the rectangular region before packing the rectangular region into the packed picture. FIG. 4 is a diagram illustrating a first region-wise packing example according to an embodiment of the present invention. A projected picture with an ERP layout is partitioned into different regions (e.g., a top part, a middle part and a bottom part). The top part, middle part and bottom part can be mapped onto the packed picture via region-wise packing. FIG. 5 is a diagram illustrating a second region-wise packing example according to an embodiment of the present invention. A projected picture with a CMP layout is partitioned into different regions (e.g., a left face, a front face, a right face, a bottom face, a back face and a top face). The left face, front face, right face, bottom face, back face and top face can be mapped onto the packed picture via region-wise packing. It should be noted that the packed pictures shown in FIG. 4 and FIG. 5 are for illustrative purposes only, and are not meant to be limitations of the present invention.

The picture Dv may be one video frame included in a sequence of video frames generated from the conversion circuit 114. The video encoder 116 is an encoding circuit used to encode/compress the picture Dv to generate a part of a coded bitstream. After receiving the part of the coded bitstream (which includes encoded data Ev of the picture Dv) from the video encoder 116, the file encapsulation circuit 118 encapsulates the part of the coded bitstream into one or more ISOBMFF files F together with additional metadata Dm. For example, the additional metadata Dm may provide additional signaling for dynamic adaptive streaming over HTTP (DASH).

A viewport-dependent streaming scheme (e.g., a tile-based or sub-picture-based streaming scheme) may be employed for 360° video delivery. In accordance with the tile-based streaming scheme, the picture Dv is partitioned into a plurality of tiles (or sub-pictures), each being independently coded. In other words, a tile of the picture Dv is a spatial portion (i.e., a sub-picture) of the picture Dv, and is generally in a rectangular shape. Further, the content of the same tile can be coded in different qualities and bit rates to generate variants of the encoded tile, or can be coded in different codecs and protection schemes to generate variants of the encoded tile. In this case, each of the ISOBMFF files F is a tile-based file. The file encapsulation circuit 118 encapsulates each of the encoding variants of the same tile into a variant track (i.e., a variant sub-picture track), and encapsulates variant tracks of all encoding variants of the same tile into the same ISOBMFF file F. The metadata Dm may include metadata directly placed in a visual track by using a track metadata box, and/or may include metadata placed in a metadata track (e.g., timed metadata track) associated with the visual track. For example, the signaled metadata Dm may include projection/orientation information, packing information, sub-picture composition information, region of interest (ROI) information, viewport information, etc.

Alternatively, the picture Dv may be directly set by the VR content Bv on a sphere. Hence, after receiving the part of the coded bitstream (which includes encoded data Ev of the picture Dv) from the video encoder 116, the file encapsulation circuit 118 encapsulates the part of the coded bitstream into one or more ISOBMFF files F together with additional metadata Dm, where a sphere video track (i.e., VR 3D video track) is included in the ISOBMFF files F. However, this is for illustrative purposes only, and is not meant to be a limitation of the present invention. For example, the sphere video track (i.e., VR 3D video track) may be a derived track obtained from track derivation performed at a VR application end (i.e., destination electronic device 104).

The file encapsulation circuit 118 outputs the ISOBMFF files F to the destination electronic device 104 via a transmission means 103. For example, the transmission means 103 may be a wired/wireless communication link, and the ISOBMFF files F are delivered to the destination electronic device 104 over HTTP using unicast, multicast or broadcast delivery.

The destination electronic device 104 may be a head-mounted display (HMD) device. As shown in FIG. 1, the destination electronic device 104 includes a file decapsulation circuit 120, a video decoder 122, a graphic rendering circuit 124, and a display screen 126. The file decapsulation circuit 120 receives ISOBMFF files F' from the transmission means 103. If there are no transmission errors, ISOBMFF files F' received by the file decapsulation circuit 120 should be the same as ISOBMFF files F output from the file encapsulation circuit 118. After receiving the ISOBMFF files F', the file decapsulation circuit 120 decapsulates the ISOBMFF files F' into a part of a coded bitstream (which includes an encoded data E'v of a picture to be reconstructed), and extracts/parses the accompanying metadata D'm from the ISOBMFF files F'. If there are no transmission errors and decapsulation errors, the metadata D'm extracted/parsed from the ISOBMFF files F' should be the same as the metadata Dm added to the ISOBMFF files F.

The video decoder 122 is coupled between the file decapsulation circuit 120 and the graphic rendering circuit 124, and is a decoding circuit arranged to decode the part of the coded bitstream according to the extracted/parsed metadata D'm. For example, the video decoder 122 decodes the part of the coded bitstream to obtain decoded data D'v of a viewport (e.g., an initial viewport or a recommended viewport) specified by the signaled metadata D'm. The graphic rendering circuit 124 is a post-processing circuit arranged to render and display the viewport on the display screen 126 according to display data A'v obtained from the decoded data of the viewport.

Recently, new video applications have emerged. In particular, 360 video (a.k.a. omnidirectional video, spherical video) and virtual reality (VR) use cases, which capture a real-world panorama, have drawn significant attention. MPEG is standardizing an application format "Omnidirectional Media Application Format (OMAF)", to specify format for storage, delivery, rendering of omnidirectional media content. In the Committee Draft (CD) of OMAF, timed metadata for region on sphere is signaled, which can be used to indicate viewpoint and viewport. The generic syntax structure is to signal the center point (yaw, pitch), and then optionally the horizontal and vertical coverage, for viewport. For viewpoint (both horizontal and vertical coverage are zero), the present invention proposes that a parameter roll is also signaled.

Figure 6:
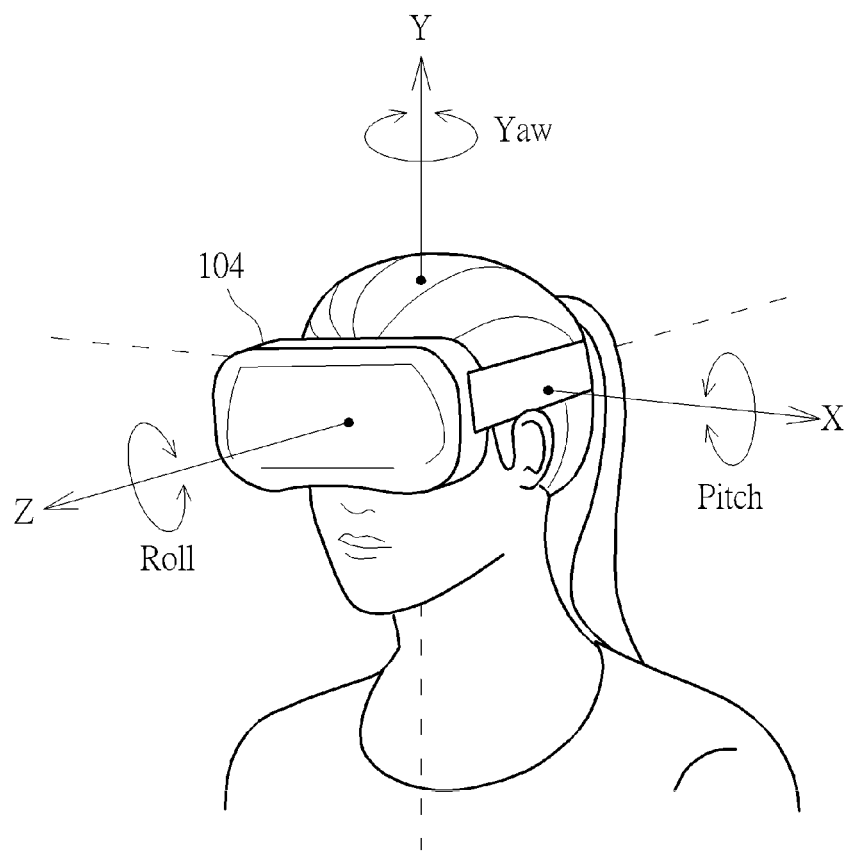
FIG. 6 is a diagram illustrating movement of a destination electronic device according to an embodiment of the present invention.
Figure 7:
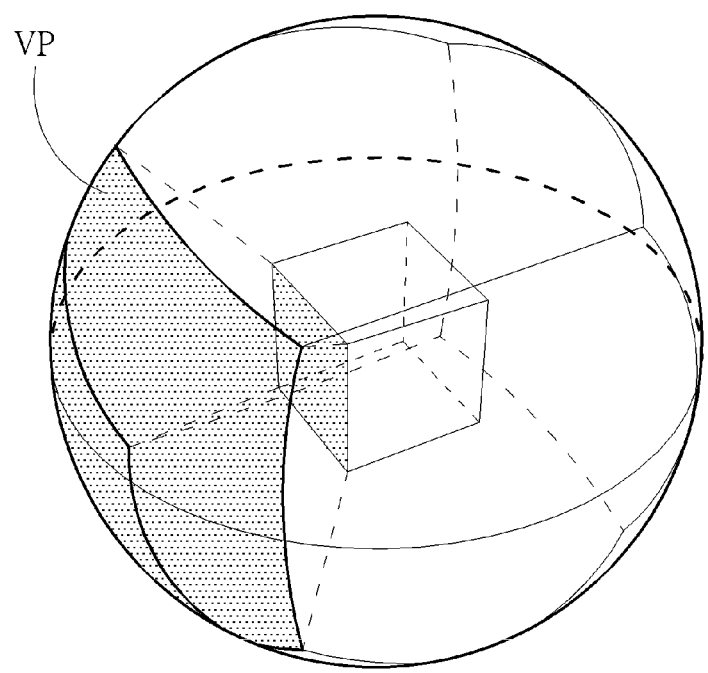
FIG. 7 is a diagram illustrating a viewport on a sphere according to an embodiment of the present invention.

FIG. 6 is a diagram illustrating movement of the destination electronic device 104 according to an embodiment of the present invention. FIG. 7 is a diagram illustrating a viewport on a sphere according to an embodiment of the present invention. As mentioned above, the destination electronic device 104 may be an HMD device worn on the user's head or any other device capable of displaying Virtual Reality content. Hence, orientation of the destination electronic device 104 is also the viewing orientation of the user, and can be specified by a yaw angle along the Y axis, a pitch angle along the X axis, and a roll angle along the Z axis. If the orientation of the destination electronic device 104 changes, the location and/or the shape of the viewport VP on a sphere (e.g., sphere 200 shown in FIG. 2 and FIG. 3) changes.

Figure 8:
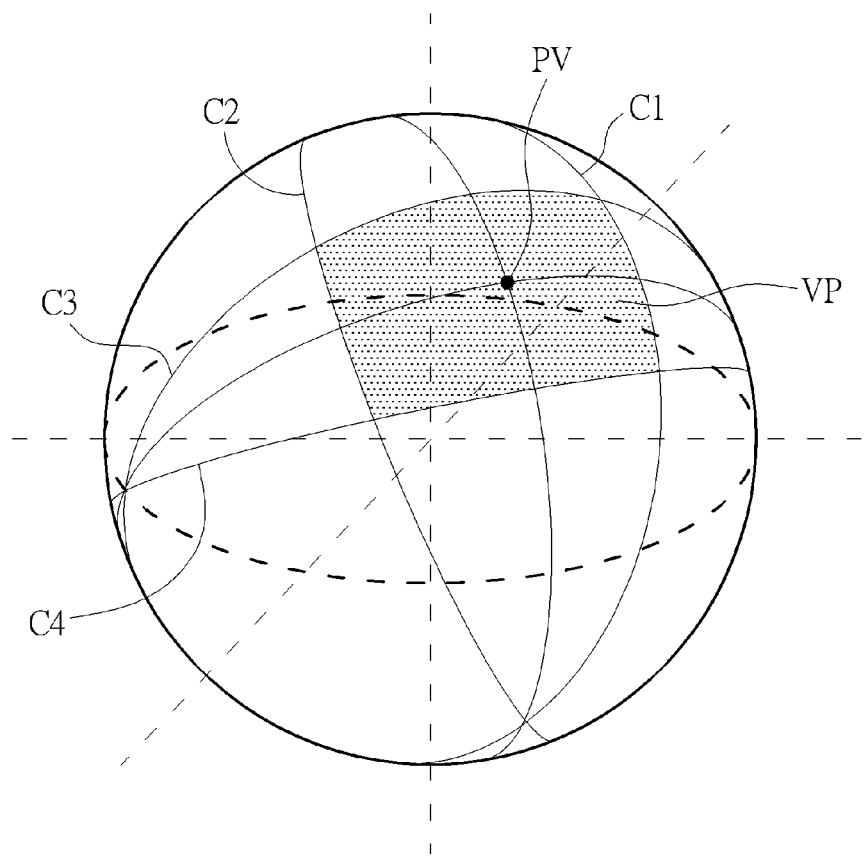
FIG. 8 is a diagram illustrating a first shape type of the viewport VP on a sphere according to an embodiment of the present invention.
Figure 9:
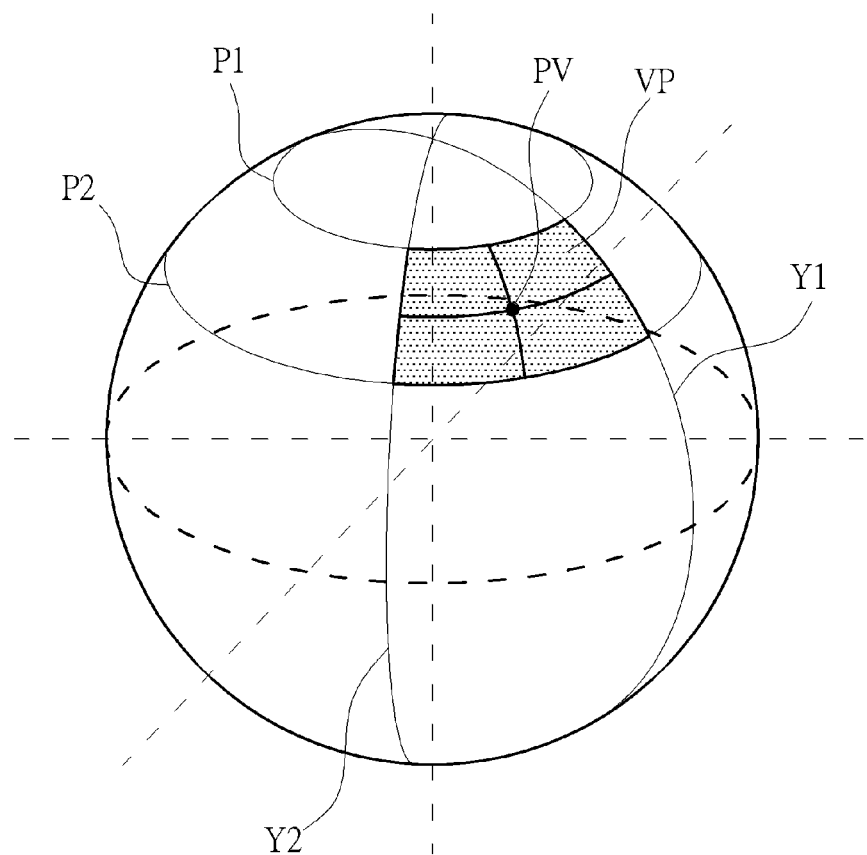
FIG. 9 is a diagram illustrating a second shape type of the viewport VP on a sphere according to an embodiment of the present invention.

For viewport signaling, at least two shape types are defined: one bounded by four great circles, and the other bounded by two yaw circles and two pitch circles. FIG. 8 is a diagram illustrating a first shape type of the viewport VP on a sphere according to an embodiment of the present invention. The viewpoint PV is the center point of the viewport VP. The boundaries of the viewport VP are decided by four great circles C1, C2, C3, and C4, each of which intersects the sphere and is on a plane passing through a center of the sphere. FIG. 9 is a diagram illustrating a second shape type of the viewport VP on a sphere according to an embodiment of the present invention. The viewpoint PV is the center point of the viewport VP. The boundaries of the viewport VP are decided by two yaw circles Y1 and Y2 and two pitch circles P1 and P2. Each yaw circle is a circle on the sphere that connects all points with the same yaw angle value. Each pitch circle is a circle on the sphere that connects all points with the same pitch angle value.

The present invention proposes a method to support roll for viewport signaling. For example, the ISOBMFF files F generated from the file encapsulation circuit 118 at a VR service provider end (i.e., source electronic device 102) include at least a first parameter center_yaw, a second parameter center_pitch, and a third parameter center_roll associated with orientation of the viewport VP on a sphere, with the first parameter center_yaw, the second parameter center_pitch, and the third parameter center_roll indicating a yaw angle, a pitch angle, and a roll angle of a center of the viewport VP (i.e., viewpoint PV), respectively. The first parameter center_yaw, second parameter center_pitch, and third parameter center_roll are signaled to a VR application end (i.e., destination electronic device 104). After the ISOBMFF files F' are received by the file decapsulation circuit 120 at the VR application end (i.e., destination electronic device 104), the first parameter center_yaw, second parameter center_pitch, and third parameter center_roll are extracted/parsed from the ISOBMFF files F' to indicate a center of the viewport VP (i.e., viewpoint PV) and a roll angle of the viewport VP.

Further, the ISOBMFF files F generated from the file encapsulation circuit 118 at the VR service provider end (i.e., source electronic device 102) may also include at least a fourth parameter hor_range and a fifth parameter ver_range associated with the viewport VP on a sphere, where the fourth parameter hor_range indicates a horizontal range of the viewport, and the fifth parameter ver_range indicates a vertical range of the viewport. The fourth parameter hor_range and the fifth parameter ver_range are also signaled to the VR application end (i.e., destination electronic device 104). After the ISOBMFF files F' are received by the file decapsulation circuit 120 at the VR application end (i.e., destination electronic device 104), the fourth parameter hor_range and the fifth parameter ver_range are extracted/parsed from the ISOBMFF files F' to indicate a horizontal range of the viewport and a vertical range of the viewport, respectively.

A Region on Sphere Sample format is specified in Section 7.3.3. in CD of OMAF. In one exemplary implementation, the third parameter center_roll is added to the Region on Sphere Sample format, such that the metadata, including the first parameter center_yaw, second parameter center_pitch and third parameter center_roll, is placed in every visual track (e.g., every variant sub-picture track). The modified sample format may be defined as below.

Sample Format

Definition

Each sample specifies a region on a sphere. The RegionOnSphereSample structure may be extended in derived track formats.

Syntax

```
aligned(8) RegionOnSphereStruct(range_included_flag) {
    signed int(16) center_yaw;
    signed int(16) center_pitch;
    signed int(16) center_roll;
    if (range_included_flag) {
        unsigned int(16) hor_range;
        unsigned int(16) ver_range;
    }
}
aligned(8) RegionOnSphereSample( ) {
    for (i = 0; i < num_regions; i++)
        RegionOnSphereStruct(dynamic_range_flag)
}
```

Semantics

When RegionOnSphereStruct( ) is included in the RegionOnSphereSample( )structure, the following applies:

center_yaw, center_pitch, and center_roll specify the viewport orientation in units of 0.01 degrees relative to the global coordinate system. center_yaw and center_pitch indicate the center of the viewport, and center_roll indicates the roll angle of the viewport. center_roll shall be in the range of −18000 to 18000, inclusive.

hor_range and ver_range, when present, specify the horizontal and vertical ranges, respectively, of the region specified by this sample in units of 0.01 degrees. hor_range and ver_range specify the range through the center point of the region.

For viewpoint signalling (section 7.3.4 in Committee Draft (CD) of OMAF), roll does not need to be signalled again as it is already signalled in the sample format. The modified sample format is defined as below.

shape_type shall be equal to 0, dynamic_range_flag shall be equal to 0, static_hor_range shall be equal to 0, and static_ver_range shall be equal to 0 in the RegionOnSphere-ConfigBox of the sample entry.

Sample Syntax

```
class InitialViewpointSample( ) extends RegionOnSphereSample {
  unsigned int(1) refresh_flag;
  bit(7) reserved = 0;
}
```

As mentioned above, parameters center_yaw, center_pitch, center_roll, hor_range, and ver_range associated with the viewport VP on a sphere are signalled from the VR service provider end (i.e., source electronic device 102) to the VR application end (i.e., destination electronic device 104). Hence, the VR application end (i.e., destination electronic device 104) can identify the location and the boundaries of the viewport (e.g., an initial viewport or a recommended viewport) according to the signaled parameters center_yaw, center_pitch, center_roll, and hor_range, ver_range. For example, the video decoder 122 and/or the graphic rendering circuit 124 can identify the viewport according to the signalled parameters.

Figure 10:
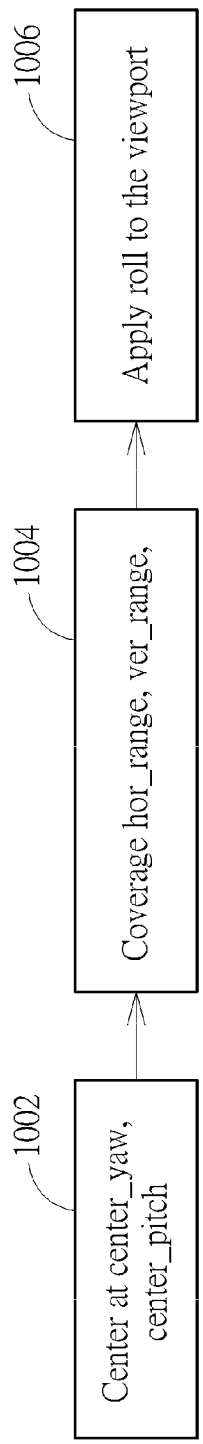
FIG. 10 is a flowchart illustrating a first method for identifying a viewport on a sphere according to an embodiment of the present invention.

FIG. 10 is a flowchart illustrating a first method for identifying a viewport on a sphere according to an embodiment of the present invention. The viewport is first centered at a yaw angle indicated by the first parameter center_yaw and a pitch angle indicated by the second parameter center_pitch (Step 1002). After the viewport is centered at the yaw angle and the pitch angle, boundaries of the viewport are determined according to a coverage that is specified by the horizontal range indicated by the fourth parameter hor_range and the vertical range indicated by the fifth parameter ver_range (Step 1004). After the boundaries of the viewport are determined, rotation is applied to the viewport according to the roll angle indicated by the third parameter center_roll.

Figure 11:
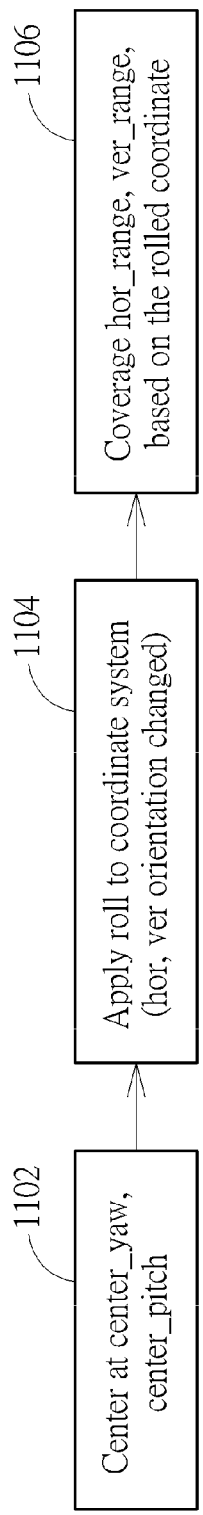
FIG. 11 is a flowchart illustrating a second method for identifying a viewport on a sphere according to an embodiment of the present invention.

FIG. 11 is a flowchart illustrating a second method for identifying a viewport on a sphere according to an embodiment of the present invention. The viewport is first centered at a yaw angle indicated by the first parameter center_yaw and a pitch angle indicated by the second parameter center_pitch (Step 1102). After the viewport is centered at the yaw angle and the pitch angle, rotation is applied to a coordinate system according to a roll angle indicated by the third parameter center_roll (Step 1104). It should be noted that this operation will change the orientation of the horizontal direction and the vertical direction. After the coordinate system is rotated with the roll angle, the coverage is applied according to the new horizontal and vertical orientations. That is, after the coordinate system is rotated with the roll angle, boundaries of the viewport are determined according to the coverage that is specified by the horizontal range indicated by the fourth parameter hor_range and the vertical range indicated by the fifth parameter ver_range (Step 1106).

Note that, for the viewport shape bounded by four great circles as shown in FIG. 8, the first method shown in FIG. 10 and the second method shown in FIG. 11 produce the same results due to the fact that the circles are not affected by the orientation of horizontal and vertical directions. However, for the viewport shape with two yaw circle and two pitch circles as shown in FIG. 9, the first method shown in FIG. 10 and the second method shown in FIG. 11 will result in different viewports. This is because the definition of yaw and pitch circles will change according to the orientation change of the coordinate system.

In some embodiments of the present invention, for viewport signalling, parameter roll is only added to the viewport shape with 4 great circles. As discussed in the above paragraph, roll on the other viewport shape creates a problem as the order of roll and coverage needs to be specified. Thus, in an alternative design, roll is prohibited for 2 yaw circle+2 pitch circle shape. For example, the signalled parameter center_roll is ignored. The syntax can be designed in the same manner as mentioned above. However, a semantic constraint is added as below:

center_yaw, center_pitch, and center_roll specify the viewport orientation in units of 0.01 degrees relative to the global coordinate system. center_yaw and center_pitch indicate the center of the viewport, and center_roll indicates the roll angle of the viewport. center_roll shall be in the range of −18000 to 18000, inclusive. When shape_type is 1, the parameter center_roll is ignored, and has no effect on the viewport.

In many applications such as VR and Free-view Television (FTV), it is desirable to signal and derive tracks as composite ones from existing tracks (e.g., visual tracks existing in the ISOBMFF files F/F' shown in FIG. 1).

For instance, due to current network bandwidth limitations and various adaptation requirements (e.g., on different qualities, codecs and protection schemes), spherical VR content has the following generic viewport dependent content flow process (which is a simplified version of the canonicalized one, without considering the canonicalization part of media sources), in which the 3D spherical VR content is first processed (stitched, projected and mapped) onto a 2D plane and then encapsulated in a number of tile-based and segmented files for playback and delivery. In such a tile-based and segmented file, a spatial tile on the 2D plane, representing a spatial portion, usually in a rectangular shape, of the 2D plane content, is encapsulated as a collection of its variants (such as in different qualities and bitrates as shown in the diagram, or in different codecs and protection schemes—using different encryption algorithms and modes); these variants correspond to representations within adaptation sets in MPEG DASH. It is based on user's selection on a viewport that some of these variants of different tiles that, when put together, provide a coverage of the selected viewport, are retrieved by or delivered to the receiver, and then decoded to construct and render the desired viewport.

Figure 12:
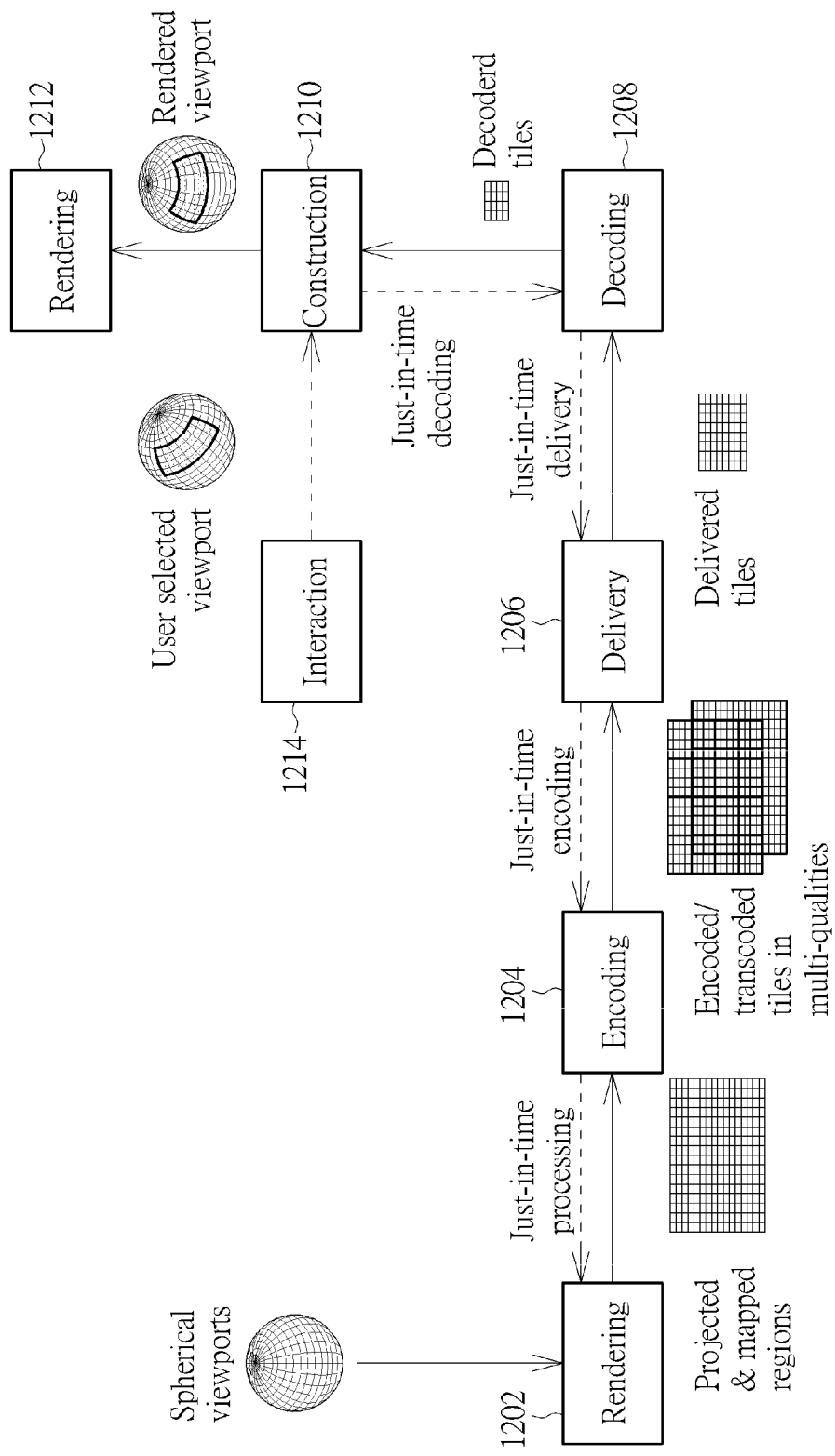
FIG. 12 is a diagram illustrating one VR streaming architecture according to an embodiment of the present invention.

FIG. 12 is a diagram illustrating one VR streaming architecture according to an embodiment of the present invention. Step 1202 may be performed at the video capture device 112 and/or the conversion circuit 114 shown in FIG. 1. Step 1204 may be performed at the video encoder 116 shown in FIG. 1. Step 1206 may be performed at the transmission means 103 shown in FIG. 1. Step 1208 may be performed at the video decoder 122 shown in FIG. 1. Steps 1210 and 1212 may be performed at the graphic rendering circuit 124 shown in FIG. 1. Step 1214 may be performed by a head/eye tracking function of the VP application end (i.e., destination electronic device 104).

To avoid the redundancy in coding same content, there are no bigger or smaller tiles (sub-pictures) that represent the same content of other tiles (sub-pictures). Thus, when tracks are used to encapsulate individual tiles, the lack of hierarchical structure among tracks within a file leads to a lack of hierarchical structure among tiles. All of this presents some issues when addressing properties and specifying metadata for the collection of tiles in their respective tracks. For instance, when signaling projection and packing schemes in the latest OMAF draft specification, the projected omnidirectional video box and region-wise packing box are all for their referenced tracks that are an entire 2D projected and packed frames, not for individual tile or region tracks, which make these boxes not suitable for use in viewport dependent VR content processing, for instance, that is illustrated in Annex A in CD of OMAF.

Within ISOBMFF, there are some grouping mechanisms for tracks (and hence for tiles), through usages of boxes such as the Track Group Box 'trgr', Track Header Box 'tkhd', and the Track Selection Box 'tsel', to label tracks and signal them as a group of tracks, an alternate group of tracks and a switch group of tracks, so that individual tracks with a same group identifier and group type belong to a same group.

However, these track grouping mechanisms through labeling individual tracks present a number of issues and difficulties, when used in the context of the generic viewport dependent content flow process. These issues result from the facts that there is no a single "tile" track that represents content of the variant tracks of a tile, and there is no single track that represents content of the entire spherical VR content which is projected and optionally packed to a composition of all individual "tile" tracks. The issues include:

1. In-efficiency in determining how many tracks belong to a particular group, without scanning through all the tracks in the file.
2. Infeasibility in associating any global information (such as projection and mapping information, viewports, ROIs, and other metadata) about the entire spherical VR content with any particular track, if not with each and every "variant" track; this is because any metadata track (such as timed metadata of spatial information) shall be associated with a media track it describes by means of a 'cdsc' (content describes) track reference. The requirement on associating each metadata track with each and every media "variant" track will become cumbersome and tedious, if the multiplication of the number of tiles and the number of variants of each tile gets relatively large. 3. Difficulty in supporting construction of new tracks from a group of existing tracks, in order to supporting, for example, the just-in-time viewport construction to cover some target ROIs.

Nevertheless, when coming to situations where existing media sources are stored or encapsulated in media tracks of ISOBMFF, it is suggested in the technologies under consideration that a visual track to be constructed is a derived track identified by its containing sample entry of type 'dtrk'. A derived sample contains an ordered list of the operations to be performed on an ordered list of input images or samples. Each of the operations is specified or indicated by the TransformProperty.

Figure 13:
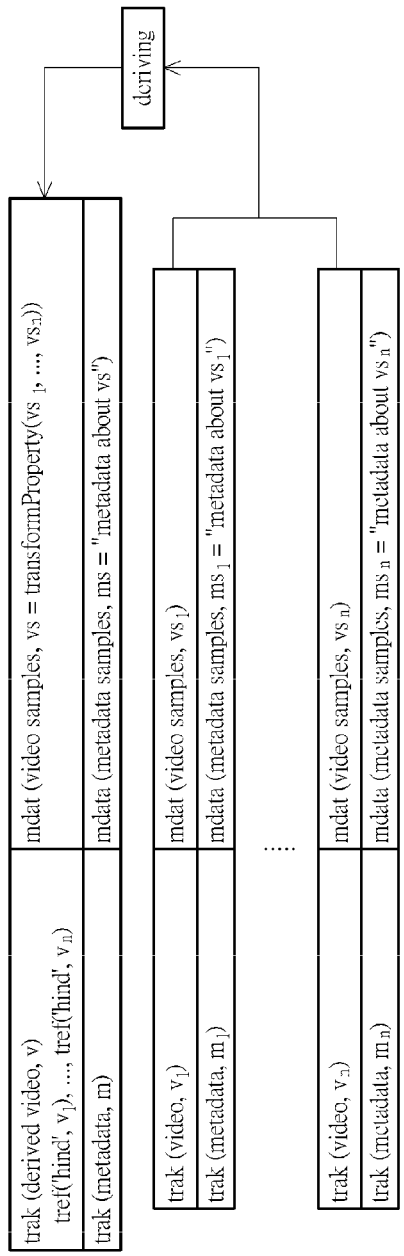
FIG. 13 is a diagram illustrating track derivation, using a single transformation, according to an embodiment of the present invention.

FIG. 13 is a diagram illustrating track derivation, using a single transformation, according to an embodiment of the present invention. As shown in FIG. 13, there are existing visual tracks (which are contained in track boxes of type 'trak') $v_1, \ldots,$ and $v_n$ with media contents (which are contained in data boxes of type 'mdat') $vs_1, \ldots,$ and $vs_n$, respectively. Each of the existing visual tracks has a track reference box 'tref' with a reference type 'hind'. In addition, there are metadata tracks (which are contained in track boxes of type 'trak') $m_1, \ldots,$ and $m_n$ with media contents (which are contained in data boxes of type 'mdata') $ms_1, \ldots,$ and $ms_n$, respectively. The metadata tracks $m_1, \ldots,$ and $m_n$ may be timed metadata tracks, and can be associated with or can make reference to the existing visual tracks $v_1, \ldots,$ and $v_n$ to provide metadata about media contents in the existing visual tracks $v_1, \ldots,$ and $v_n$. A derived track is a logical track derived from the existing visual tracks in the ISOMBFF files F/F' according to a track derivation operation specified by the TransformProperty item. As shown in FIG. 13, the derived track v (which is contained in a track box of type 'trak') with the media content vs is derived from a transformation operation specified or indicated by the TransformProperty item. In addition, a metadata track m (which is contained in a data box of type 'mdat') with a media content ms can be associated with or can make reference to the derived track v to provide metadata about the media content in the derived track v. The metadata track m may be a timed metadata track.

The existing list of TransformProperty items is:
1. 'idtt': identity
2. 'clap': clean aperture
3. 'srot': rotation
4. 'dslv': dissolve
5. '2dcc': crop Clearly, this still lacks of support for constructing composite tracks, in order to support the VR viewport dependent content flow process.

The following new TransformProperty items are proposed for deriving composite tracks:
1. 'cmpa': composite of all
2. 'cmp1': composite of only one (allowing switching at the sample level)
3. 'cmpn': composite of any (allowing switching at the sample level)
4. 'sel1': selection of only one (track level selection, no switching at the sample level)
5. 'seln': selection of any (track level selection, no switching at the sample level)
6. 'scal': scaling
7. 'resz': resizing The labeling mechanisms of track grouping, selection and switch are used to provide alternative definitions for the following TransformProperty items:
1. 'cmpa': composite of all
2. 'cmp1': composite of only one (allowing switching at the sample level)
3. 'sel1': selection of only one (track level selection, no switching at the sample level)

Figure 14:
FIG. 14 is a diagram illustrating track derivations of composite tracks according to an embodiment of the present invention.

FIG. 14 is a diagram illustrating track derivations of composite tracks according to an embodiment of the present invention. The composite tracks v, $v_1, \ldots,$ and $v_r$ are derived from other tracks $v_{11}, \ldots, v_{1k}, \ldots, v_{r1}, \ldots,$ and $v_{rk}$, where each $v_i$, i=1, . . . , r, is an alternate of its variants, $v_{ij}$, j= 1, . . . , k, either switchable or not switchable at the sample level, and v is a composite of all $v_1, \ldots,$ and $v_r$. With these derived tracks, metadata tracks (e.g., timed metadata tracks) m, $m_1, \ldots,$ and $m_r$ can be associated with or can make reference to them to provide metadata about media content in these tracks.

This present invention further provides methods and systems for deriving tracks from other tracks using projection, reverse projection, packing (mapping) and/or reverse packing (reverse mapping) transformations. Specifically, the present invention further proposes the following TransformProperty items:
1. 'proj': projection and reverse projection
2. 'pack': packing and reverse packing Hence, the ISOBMFF files F generated from the file encapsulation circuit 118 at the VR service provider end (i.e., source electronic device 102) can include a TransformProperty item that instructs track derivation arranged to obtain a derived track from at least one visual track (e.g., existing track(s) or derived track(s)), where the Transform-Property item is set to enable one of a projection transformation (TransformProperty='proj') and a packing transformation (TransformProperty='pack') in the track derivation.

Similarly, the ISOBMFF files F' received by the file decapsulation circuit 120 at the VR application end (i.e., destination electronic device 104) can include a Transform-Property item that is set to enable one of a projection transformation (TransformProperty='proj') and a packing transformation (TransformProperty='pack') in track derivation. The video decoder 122 decodes a part of a coded bitstream that is decapsulated from the file decapsulation circuit 120. The graphic rendering circuit 124 obtains at least one visual track (e.g., existing track(s) or derived track(s)) according to a decoding result of the part of the coded bitstream, and performs track derivation instructed by the TransformProperty item extracted/parsed from the ISOBMFF files F' to derive a VR projection related track in ISOBMFF or a VR packing (mapping) related track in ISOBMFF.

In a first case where the TransformProperty item is set to enable the projection transformation (i.e., TransformProperty='proj'), an operation of the projection transformation may be set by forward projection which is arranged to project a media content of at least one visual track onto a two-dimensional (2D) plane. Alternatively, an operation of the projection transformation may be set by reverse projection which is arranged to reversely project a media content of at least one visual track onto a three-dimensional (3D) space. For example, each of the at least one visual track is obtained from track derivation, the at least one visual track includes a projected two-dimensional (2D) video track, and the derived track is an un-projected VR 3D video track.

In a second case where the TransformProperty item is set to enable the packing transformation (i.e., TransformProperty='pack'), an operation of the packing transformation may be set by forward packing which is arranged to pack a media content of at least one visual track onto a two-dimensional (2D) plane. Alternatively, an operation of the packing transformation may be set by reverse packing which is arranged to reversely pack a media content of said at least one visual track onto a two-dimensional (2D) plane. For example, each of the at least one visual track is obtained from track derivation, the at least one visual track includes a projected and packed two-dimensional (2D) video track, and the derived track is a projected 2D video track.

With these new items 'proj' and 'pack' proposed by the present invention and the ones already proposed, a number of derived tracks can be specified within an ISOBMFF file, as follows: a "tile" (or "region") track can be specified as a derived composite track of its "variant" tracks using 'cmp1' or 'sel1',
the projected and mapped (or packed) track can be specified as a derived composite track of its "tile" tracks using 'cmpa',
the projected track can be specified as a derived track of the projected and mapped track using (reverse) 'pack', and
the un-projected (or original, initial) video track can be specified as a derived track of the projected track using (reverse) 'proj'.

Figure 15:
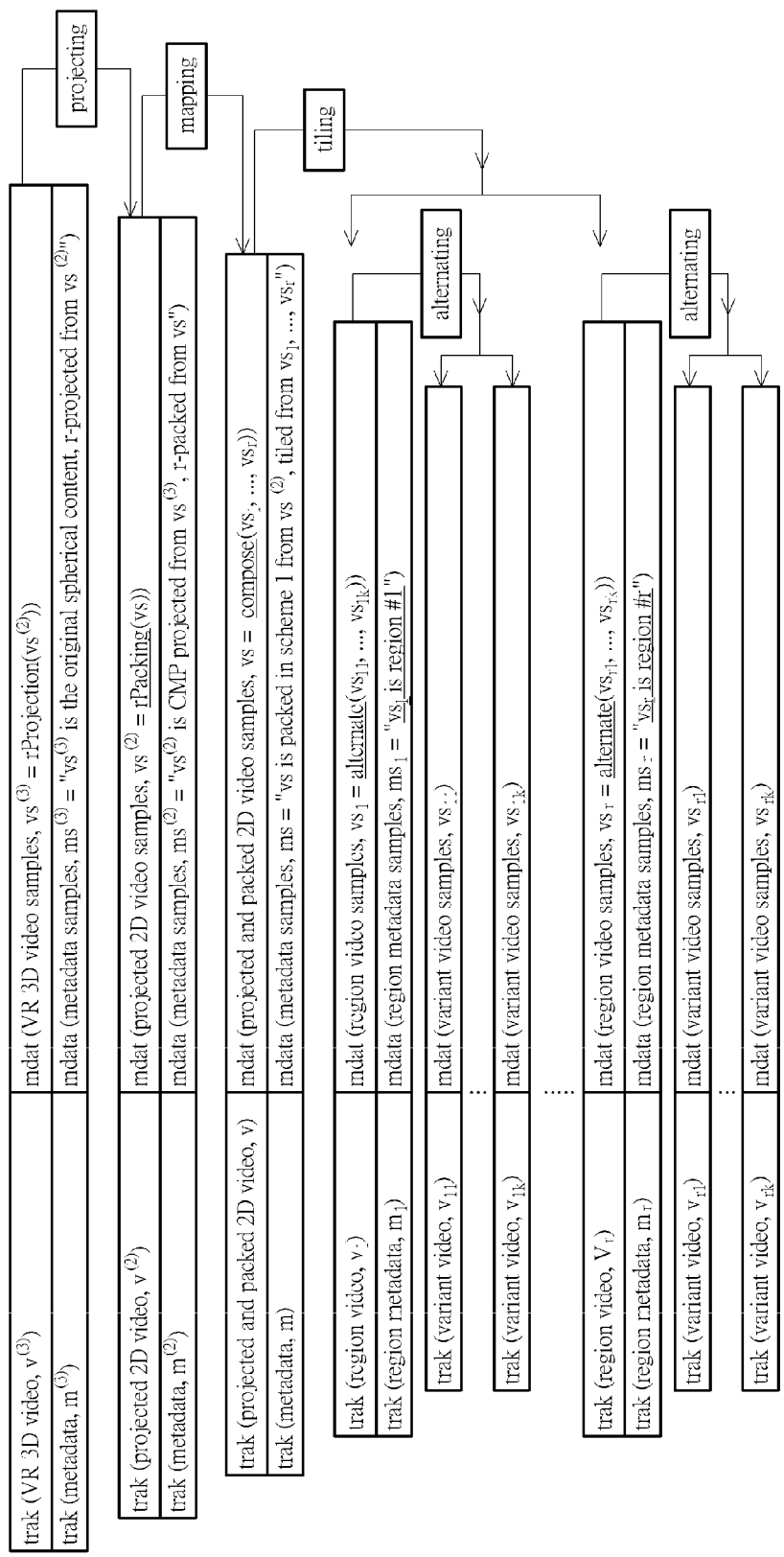
FIG. 15 is a diagram illustrating a hierarchy of tracks, based on track derivation, according to an embodiment of the present invention.

FIG. 15 is a diagram illustrating a hierarchy of these tracks, based on track derivation, together with appropriate metadata associated the derived tracks according to an embodiment of the present invention. As shown in FIG. 15, rProjection, rPacking, compose and alternate represent the TransformProperty items, reverse 'proj', reverse 'pack', 'cmpa' and 'cmp1' (or 'sel1'), respectively. Note that the metadata shown in the metadata tracks are for the illustration purpose; they can be defined more rigorously (e.g., projection types like CMP and ERP, and packing schemes like scheme 1 and region-wise packing schemes) by CD of OMAF, and also put as metadata into the video tracks.

Figure 16:
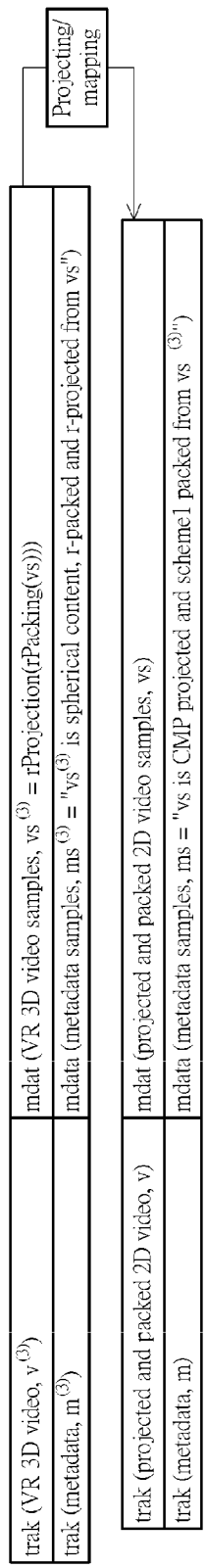
FIG. 16 is a diagram illustrating reverse packing and reverse projection composed together according to an embodiment of the present invention.

In the cases where some intermediate derived tracks are not necessarily needed in the hierarchy above, the related derivation steps can be composed into one, like the case illustrated by FIG. 16, where the reverse packing and reverse projection are composed together to eliminate the existence of the projected track $v^{(2)}$.

Also note that it is also possible to let each of the input tracks carry its spatial metadata either in an associated timed metadata track or as video track metadata.

The new TransformProperty items 'proj' and 'pack' proposed by the present invention are defined as below.
Projection
Definition
Box Type: 'proj'
Mandatory (per sample): No
Quantity (per sample): Any The projection 'proj' transform property, when present, requires that num_inputs is greater or equal to 1, and the input entities for the corresponding image operation are visual tracks. All the input tracks may belong to a same track group (i.e., they may all contain a Track Group Box 'trgr' with a same track_group_id value), but no any two of the tracks belong to a same alternate track group (i.e., they contain no Track Header Box 'tkhd' with a same non-zero alternate_group value that indicates they belong to a same alternate group for the purpose of selecting only one from the alternate group).

This transform property specifies a geometry type geometry_type of the un-projected track(s), a projection type projection_type of the un-projected track(s) onto the projected track(s), and an indicator is_reverse on whether the operation is a (forward) projection or reverse projection one. When the operation is a (forward) projection, the media content in all the input tracks are of the same geometry type, and each of the tracks is projected onto the 2D plane according to the projection type (such as ERP, CMP, etc.). When the operation is a reverse projection, the media content in all the input tracks are on 2D frames, and each of the tracks is reversely projected onto the geometry of the geometry type, according to the projection type (such as ERP, CMP, etc.).

Note that, when coming to the cases where the un-projected track(s) contain omnidirectional video whose projection metadata are specified by CD of OMAF, this projection 'prof' transform property can be defined using its projection metadata, such as those carried in ProjectedOmnidirectionalVideoBox.

Also note that, the introduction of the indicator is for the syntax compactness purpose; it is possible to define transform properties for projection and reverse projection separately.
Syntax

```
aligned(8) class Projection
extends TransformProperty('proj') {
bit(1) is_reverse;
unsigned int(6) geometry_type;
bit(1) reserved = 0;
unsigned int(8) projection_type;
}
```

Note that if the projection metadata, such as ProjectedOmnidirectionalVideoBox, specified in CD of OMAF is used, the syntax can be defined as follows:

```
aligned(8) class Projection
extends TransformProperty('proj') {
bit(1) is_reverse;
bit(7) reserved = 0;
ProjectedOmnidirectionalVideoBox( );
}
```

Semantics is_reverse indicates if the operation is a (forward) projection ('=0') or a reverse projection ('=1').

geometry_type, projection_type and ProjectedOmnidirectionalVideoBox have the same semantics as the metadata defined in CD of OMAF.

Packing (or Mapping)
Definition
Box Type: 'pack'
Mandatory (per sample): No
Quantity (per sample): Any The packing 'pack' transform property, when present, requires that num_inputs is greater or equal to 1, and the input entities for the corresponding image operation are visual tracks. All the input tracks may belong to a same track group (i.e., they may all contain a Track Group Box 'trgr' with a same track_group_id value), but no any two of the tracks belong to a same alternate track group (i.e., they contain no Track Header Box 'tkhd' with a same non-zero alternate_group value that indicates they belong to a same alternate group for the purpose of selecting only one from the alternate group).

This transform property specifies a packing type packing_type of the packed track(s), a packing structure PackingStruct of the un-packed track(s) onto the packed track(s), and an indicator is_reverse on whether the operation is a (forward) packing or reverse packing one. When the operation is a (forward) packing, the media content in each of the input tracks, which could be region or face tracks, is packed onto the 2D plane according to the packing type (such as the rectangle region packing when packing_type=0). When the operation is a reverse packing, the media content in each of the input tracks is reversely packed onto the 2D plane according to the packing type (such as the rectangle region packing when packing_type=0).

Also note that, the introduction of the indicator is for the syntax compactness purpose; it is possible to define transform properties for packing and reverse packing separately.

Syntax

```
aligned(8) class Packing
extends TransformProperty('pack') {
bit(1) is_reverse;
unsigned int(6) packing_type;
bit(1) reserved = 0;
PackingStruct( );
}
aligned(8) class PackingStruct {
unsigned int(32) proj_frame_width;
unsigned int(32) proj_frame_height;
if (packing_type == 0) {
for (i = 0; i < num_inputs; i++)
RectRegionPacking(i);
}
}
```

Semantics is_reverse indicates if the operation is a (forward) packing ('=0') or a reverse packing ('=1').

proj_frame_width, proj_frame_height, packing_type, and RectRegionPacking have the same semantics as the metadata defined in CD of OMAF.

Note that the structure of Packing is similar to the one of RegionWisePackingBox in CD of OMAF, with the consideration that the inputs to the operation are input tracks, not input regions, whose number is specified by num_inputs, not num_regions, and some simplification on not requiring each input track with its own packing_type. Other structures can be introduced in a similar manner if non-region-wise packing schemes or other packing types are to be used.

The following TransformProperty items are proposed for deriving 2D ROI and 3D viewport related tracks:
1. 'sroi': 2D rectangular ROI
2. 'svpt': generic 3D viewport of a variety of shapes in 6DoF (degrees of freedoms)

Figure 17:
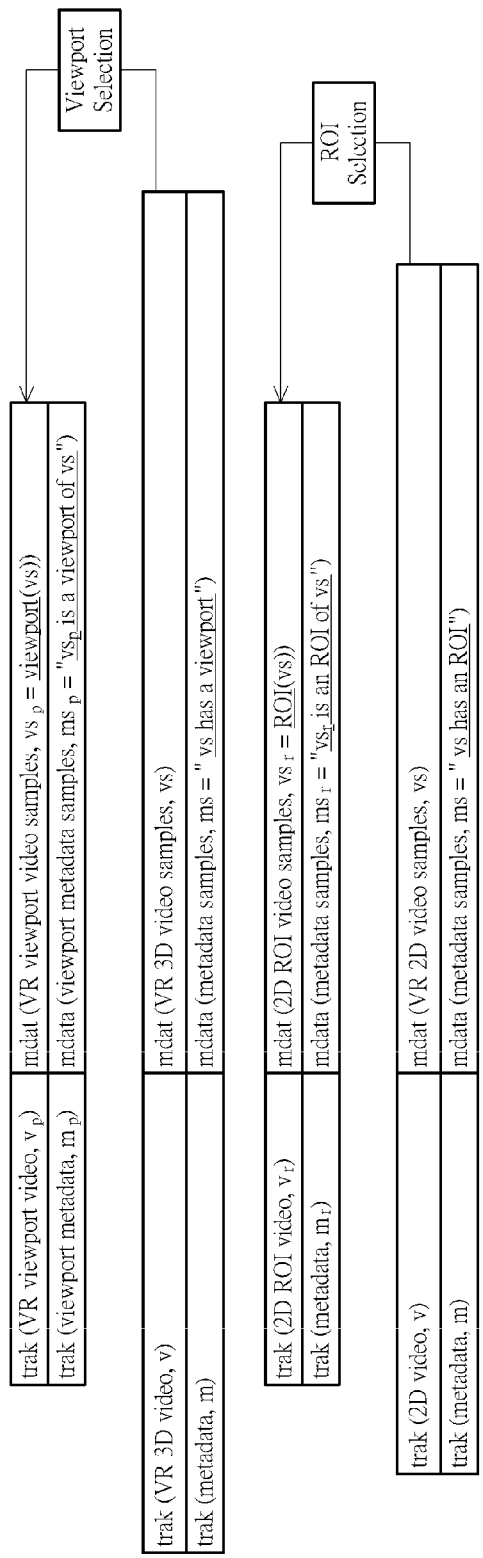
FIG. 17 is a diagram illustrating the use of two transform properties to derive 2D ROI and 3D viewport tracks according to an embodiment of the present invention.

FIG. 17 is a diagram illustrating the use of these two transform properties to derive 2D ROI and 3D viewport tracks, and appropriate associations of their respective metadata tracks according to an embodiment of the present invention.

The present invention further provides embodiments for deriving VR ROI and VR viewport related tracks from other tracks, in addition to the ones already proposed. Specifically, the present invention proposes new definitions of the following TransformProperty items:
1. 'svpt': VR viewport selection
2. 'rois': VR ROI selection of a variety of shapes in 6DoF (degrees of freedoms)

Conceptually, an ROI is a region of interest in VR content, whereas a viewport is a field of view, plus its translation and orientation, of VR content; that is, an ROI is a concept related to the nature of content, whereas a viewport is viewing oriented. In this sense, they are just different concepts, in that the "size" of an ROI may be smaller or larger than a viewport size of any given HMD, and the "shape" of an ROI may well be different from a viewport shape of any given HMD. In reality, an ROI may not be an entire viewport, or may not be even covered by a viewport of any HMD in the market (e.g., yaw width >180 degree).

Hence, even though a viewport can be an ROI, the ROI concept is much more general than that of a viewport. Therefore, ROI signalling is not viewport signalling, and should be independent of any HMD's viewport limitation. This is why the new transform property 'rois' is introduced in the present invention for deriving VR ROI tracks.

The ISOBMFF files F generated from the file encapsulation circuit 118 at the VR service provider end (i.e., source electronic device 102) can include a TransformProperty item that instructs track derivation arranged to obtain a derived track from at least one visual track (e.g., existing track(s) or derived track(s)), where the TransformProperty item is set to enable one of a VR viewport selection (TransformProperty='svpt') and a VR ROI selection (TransformProperty='rois') in the track derivation.

The ISOBMFF files F' received by the file decapsulation circuit 120 at the VR application end (i.e., destination electronic device 104) can include a TransformProperty item that is set to enable one of a VR viewport selection (TransformProperty='svpt') and a VR ROI selection (TransformProperty='rois') in track derivation. The video decoder 122 decodes a part of a coded bitstream that is decapsulated from the file decapsulation circuit 120. The graphic rendering circuit 124 obtains at least one visual track (e.g., existing track(s) or derived track(s)) according to a decoding result of the part of the coded bitstream, and performs track derivation instructed by the TransformProperty item extracted/parsed from the ISOBMFF files F' to derive a VR viewport related track in ISOBMFF or a VR ROI related track in ISOBMFF.

Figure 18:
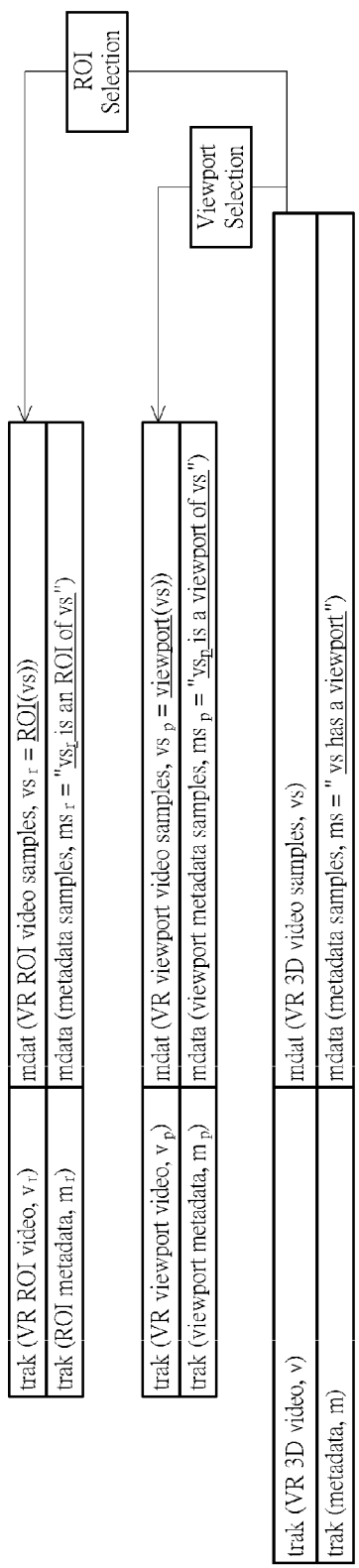
FIG. 18 is a diagram illustrating the use of the two transform properties to derive VR ROI and VR viewport tracks according to an embodiment of the present invention.

Using the two newly defined transform properties 'svpt' and 'rois', a VR viewport or ROI track can be specified as a derived track of an (original) VR video track. As mentioned above, a newly define TransformProperty item, 'svpt' or 'rois', is set to instruct track derivation that is arranged to obtain a derived track from at least one visual track. In a case where the entire original VR video track does exist (i.e., a VR 3D video track exists in the ISOBMFF files F, such that a VR 3D video track can be obtained from a part of a coded bitstream encapsulated in the ISOBMFF files F'), the at least one visual track includes the VR 3D video track. FIG. 18 is a diagram illustrating the use of the two transform properties to derive VR ROI and VR viewport tracks, and appropriate associations of their metadata tracks according to an embodiment of the present invention.

Figure 19:
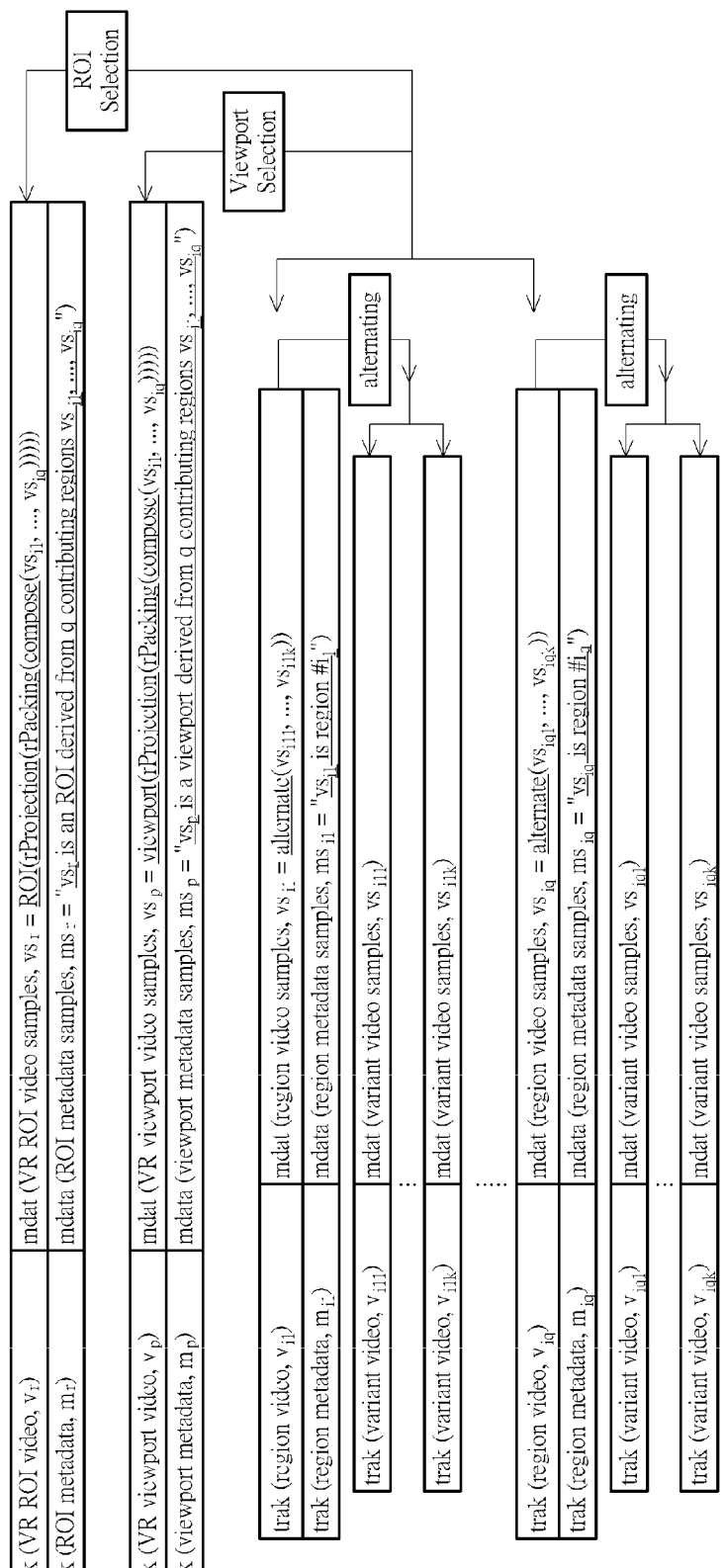
FIG. 19 is a diagram illustrating track derivation which provides a more efficient way to derive the VR viewport or ROI track according to an embodiment of the present invention.

In another case where the entire original VR video track does not exist and needs to be derived from a number of projected and packed 2D region tracks, like in viewport dependent VR video processing, a VR viewport or ROI track can be specified as a derived track of a derived composite track of its related covering "region" (or "tile"/"sub-picture") tracks, $v_{i_1}, \ldots, v_{i_q}$, where $\{i_1, \ldots, i_q\} \subseteq \{1, \ldots, r\}$, using 'cmpa', followed by the reversed mapping 'pack' and reverse projection 'proj' transformations, without going through deriving the entire original VR video track. As mentioned above, a newly define TransformProperty item, 'svpt' or 'rois', is set to instruct track derivation that is arranged to obtain a derived track from at least one visual track. In this case, each of the at least one visual track is obtained from track derivation that is based on two-dimensional (2D) region tracks existing in the ISOBMFF files F (i.e., based on two-dimensional (2D) region tracks that can be obtained from a part of a coded bitstream encapsulated in the ISOBMFF files F'). FIG. 19 is a diagram illustrating this kind of track derivation, which provides a more efficient way to derive the VR viewport or ROI track, which in a large sense reflects an efficient rendering process for displaying VR viewports or ROIs.

The new TransformProperty items 'svpt' and 'rois' are defined as below.

VR Spherical Viewport
Definition
Box Type: 'svpt'
Mandatory (per sample): No
Quantity (per sample): Any The sample viewport 'svpt' transform property constructs (or extracts) a viewport sample image from an input VR sample image item according to a viewport definition such as the one for spherical viewports given in CD of OMAF. Certainly, other viewport definitions are also possible, if geometry types of the viewport other than spherical one are used.

Syntax

```
aligned(8) class SampleVRViewport
extends TransformProperty('svpt') {
    signed int(16) center_yaw;
    signed int(16) center_pitch;
    unsigned int(8) shape_type;
    if (shape_type==1 || shape_type==2 ||
```

-continued

```
    shape_type==3 || shape_type==4) {
    unsigned int(16) hor_range;
    unsigned int(16) ver_range;
    }
}
```

Semantics
  center_yaw and center_pitch specify the locations of the center point of the viewpoint specified by this sample in units of 0.01 degrees relative to the global coordinate system. center_yaw shall be in the range of −18000 to 17999, inclusive. center_pitch shall be in the range of −9000 to 9000, inclusive.
  shape_type specifies the type of shape of the field of view (FoV) of the viewport. It takes the following values:
    0: FoV is centered at the center point, but its shape is un-specified—leaving to the display device to determine.
    1: FoV is specified by two great yaw circles and two great pitch circles
    2: FoV is specified by two small yaw circles and two great pitch circles
    3: FoV is specified by two great yaw circles and two small pitch circles
    4: FoV is specified by two small yaw circles and two small pitch circles values greater than 1 are reserved.
  hor_range and ver_range, when present, specify the horizontal and vertical ranges, respectively, of the region specified by this sample in units of 0.01 degrees. hor_range and ver_range specify the range through the center point of the region.

VR ROI
Definition
Box Type: 'rois'
Mandatory (per sample): No
Quantity (per sample): Any The sample viewport 'rois' transform property constructs (or extracts) an ROI sample image from the input VR image item according to a VR ROI definition consisting of a reference 6/3/1 DoF in a 3/2/1 dimensional space, and a shape and a size of the ROI.

Syntax

```
aligned(8) class SampleVRROI
extends TransformProperty('rois') {
    unsigned int(8) dimension;
    unsigned int(16)reference_x;
    if (dimension >= 2) {
    unsigned int(16)reference_y;
    unsigned int(16)reference_roll;
    }
        if (dimension >= 3) {
    unsigned int(16)reference_z;
    unsigned int(16)reference_pitch;
    unsigned int(16)reference_yaw;
    }
        unsigned int(16)reference_width;
    unsigned int(16)reference_height;
        unsigned int(16)x;
        if (dimension >= 2) {
    unsigned int(16)y;
    unsigned int(16)roll;
    }
        if (dimension == 3) {
    unsigned int(16)z;
    unsigned int(16)pitch;
    unsigned int(16)yaw;
    }
```

```
        unsigned int(8)shape_type;
        if (shape_type == 1 || shape_type == 2 || shape_type = 3) {
    unsigned int(16)top_left_x;
    unsigned int(16)top_left_y;
        if (shape_type == 1 || shape_type == 2) {
            unsigned int(16)width;
            unsigned int(16)height;
        }
        if (shape_type == 2) {
        unsigned int(8) rotation;
        }
        if (shape_type == 3) {
        unsigned int(16)size;
        }
    }
        else if (shape_type == 4) {
        unsigned int(16)center_x;
        unsigned int(16)center_y;
        unsigned int(16)radius;
        }
      }
    }
```

Semantics dimension indicates the dimension of the freedom space that the ROI is in. It takes a value of 1, 2 or 3.

reference_x, reference_y and reference_z give respectively the reference (or offset) values of the x-, y- and z-axis coordinates in the reference system in which values of the sway (x), heave (y) and surge (z) of all ROIs are computed.

reference_pitch, reference_yaw and reference_roll give respectively the reference (or offset) values of the pitch, yaw and roll angles in the reference system in which the pitch, yaw and roll angles of all ROIs are computed. The maximum ranges of reference_pitch, reference_yaw and reference_rol are, respectively, [0, 180], [0, 360] and [0, 360], representing the maximum angle ranges [−90, 90], [−180, 180], [−180, 180] for pitch, yaw and roll.

NOTE The maximum value ranges can also be chosen to represent the maximum angle ranges [−90, 90], [0, 360], [0, 360] for pitch, yaw and roll.

reference_width and reference_height give respectively the width and height of the reference 2D planar rectangular space in which all ROI view coordinates (top_left_x, top_left_y, center_x, and center_y) are computed.

NOTE When an ROI is in a 3/2/1-dimension space, its respective DoF's are:

6-DoF consisting of reference_x, reference_y, reference_z, reference_pitch, reference_yaw and reference_roll.

3-DoF consisting of reference_x, reference_y and reference_roll.

1-DoF consisting of reference_x.

x, y and z give respectively the values of the x-, y- and z-axis coordinates in the reference system in which the sway (x), heave (y) and surge (z) of the ROI are computed. These fields allow associating an ROI metadata track with media tracks of different qualities but representing the same visual source.

pitch, yaw and roll give respectively the values of the pitch, yaw and roll angles in the reference system in which the pitch, yaw and roll angles of the ROI are computed. These fields allow associating an ROI metadata track with media samples of referenced media tracks of different qualities but representing the same visual source.

shape indicates a shape of the ROI's FoV. Its values are listed in FIG. 20. Note it is certain that this list can be extended as appropriate and needed. For instance, a polygon shape can be defined with a circular list of viewpoints with lines connecting between two adjacent viewpoints. Further, these shapes and sizes illustrated in FIG. 20 can also be applied to the viewport.

top_left_x and top_left_y give respectively the horizontal and vertical coordinates of the top-left corner of the rectangular (shape=1), triangular (shape=2) and squared (shape=3) viewport view associated with the media sample of the referenced track.

width and height give respectively the width and height of the rectangular (shape=1) and triangular (shape=2) viewport view associated with the media sample of the referenced track.

rotation gives the orientation of the triangular (shape=2) viewport view associated with the media sample of the referenced track. Its values, 0, 1, 2 and 3 represents upside up (no rotation), upside down (180° rotation), upside left (counter clockwise 90° rotation) and upside right (clockwise 90° rotation), respectively.

size gives the size of the square (shape=3) viewport view associated with the media sample of the referenced track.

center_x and center_y give respectively the horizontal and vertical coordinates of the center of the circular (shape=3) viewport view associated with the media sample of the referenced track.

radius gives the radius of the circular (shape=3) viewport view associated with the media sample of the referenced track.

Also note that, the introduction of the indicator shape and its various values for different shape types is for the syntax compactness purpose; it is possible to define transform properties for individual shape types or any combination of shape types separately.

Those skilled in the art will readily observe that numerous modifications and alterations of the device and method may be made while retaining the teachings of the invention. Accordingly, the above disclosure should be construed as limited only by the metes and bounds of the appended claims.

The invention claimed is:

1. A video processing method comprising:
   receiving a virtual reality (VR) content;
   obtaining a picture from the VR content;
   encoding the picture to generate a part of a coded bitstream; and
   encapsulating, by a file encapsulation circuit, the part of the coded bitstream into at least one ISO Base Media File Format (ISOBMFF) file, wherein said at least one ISOBMFF file comprises a first parameter, a second parameter, and a third parameter associated with orientation of a viewport, with the first, second and third parameters indicating a yaw angle, a pitch angle and a roll angle of a center of the viewport, respectively, wherein the at least one ISOBMFF file further comprises a fourth parameter and a fifth parameter, the fourth and fifth parameters indicating a horizontal range of the viewport and a vertical range of the viewport, respectively.

2. A video processing method comprising:
   receiving at least one ISO Base Media File Format (ISOBMFF) file, wherein virtual reality (VR) content is delivered by said at least one ISOBMFF file, and said at least one ISOBMFF file comprises a transform property item;
   decapsulating, by a file decapsulation circuit, said at least one ISOBMFF file into a part of a coded bitstream, wherein the transform property item is parsed from said at least one ISOBMFF file;

decoding the part of the coded bitstream;
obtaining at least one visual track according to a decoding result of the part of the coded bitstream; and
obtaining a derived track from said at least one visual track by performing track derivation that is instructed by the transform property item, wherein the transform property item enables at least one of a projection transformation, a packing transformation, a VR viewport selection, and a VR region of interest (ROI) selection in the track derivation.

3. The video processing method of claim 2, wherein the transform property item enables at least the projection transformation; and an operation of the projection transformation is forward projection which projects a media content of said at least one visual track onto a two-dimensional (2D) plane.

4. The video processing method of claim 2, wherein the transform property item enables at least the projection transformation; and an operation of the projection transformation is reverse projection which reversely projects a media content of said at least one visual track onto a three-dimensional (3D) space.

5. The video processing method of claim 4, wherein each of said at least one visual track is obtained from track derivation, said at least one visual track comprises a projected two-dimensional (2D) video track, and the derived track is an un-projected VR 3D video track.

6. The video processing method of claim 2, wherein the transform property item enables at least the packing transformation; and an operation of the packing transformation is forward packing which packs a media content of said at least one visual track onto a two-dimensional (2D) plane.

7. The video processing method of claim 2, wherein the transform property item enables at least the packing transformation; and an operation of the packing transformation is reverse packing which reversely packs a media content of said at least one visual track onto a two-dimensional (2D) plane.

8. The video processing method of claim 7, wherein each of said at least one visual track is obtained from track derivation, said at least one visual track comprises a projected and packed two-dimensional (2D) video track, and the derived track is a projected 2D video track.

9. The video processing method of claim 2, wherein the transform property item enables at least one of the VR viewport selection and the VR ROI selection, and said at least one visual track comprises a VR 3D video track obtained from the part of the coded bitstream.

10. The video processing method of claim 2, wherein the transform property item enables at least one of the VR viewport selection and the VR ROI selection, and each of said at least one visual track is obtained from track derivation that is based on two-dimensional (2D) region tracks obtained from the part of the coded bitstream.

11. A video processing method comprising:
receiving at least one ISO Base Media File Format (ISOBMFF) file, wherein virtual reality (VR) content is delivered by said at least one ISOBMFF file, said at least one ISOBMFF file comprises a first parameter, a second parameter, and a third parameter associated with orientation of a viewport, with the first, second and third parameters indicating a yaw angle, a pitch angle and a roll angle of a center of the viewport, respectively, wherein the at least one ISOBMFF file further comprises a fourth parameter and a fifth parameter, the fourth and fifth parameters indicating a horizontal range of the viewport and a vertical range of the viewport, respectively;
decapsulating said at least one ISOBMFF file into a part of a coded bitstream, wherein the first parameter, the second parameter, and the third parameter are parsed from said at least one ISOBMFF file;
decoding the part of the coded bitstream to obtain decoded data of the viewport; and
rendering and displaying the viewport on a display screen according to the decoded data of the viewport.

12. The video processing method of claim 11, wherein the video processing method further comprises:
identifying the viewport according to the first, second, third, fourth and fifth parameters, comprising:
centering the viewport at the yaw angle indicated by the first parameter and the pitch angle indicated by the second parameter;
after the viewport is centered at the yaw angle and the pitch angle, determining boundaries of the viewport according to the horizontal range and the vertical range; and
after the boundaries of the viewport are determined, applying rotation to the viewport according to the roll angle.

13. The video processing method of claim 11, wherein the video processing method further comprises:
identifying the viewport according to the first, second, third, fourth, and fifth parameters, comprising:
centering the viewport at the yaw angle indicated by the first parameter and the pitch angle indicated by the second parameter;
after the viewport is centered at the yaw angle and the pitch angle, applying rotation to a coordinate system according to the roll angle; and
after the coordinate system is rotated with the roll angle, determining boundaries of the viewport according to the horizontal range and the vertical range.

14. A video processing apparatus comprising:
a conversion circuit, arranged to receive a virtual reality (VR) content, and obtain a picture from the VR content;
a video encoder, arranged to encode the picture to generate a part of a coded bitstream; and
a file encapsulation circuit, arranged to encapsulate the part of the coded bitstream into at least one ISO Base Media File Format (ISOBMFF) file, wherein said at least one ISOBMFF file comprises a first parameter, a second parameter, and a third parameter associated with orientation of a viewport, with the first, second and third parameters indicating a yaw angle, a pitch angle and a roll angle of a center of the viewport, respectively, wherein the at least one ISOBMFF file further comprises a fourth parameter and a fifth parameter, the fourth and fifth parameters indicating a horizontal range of the viewport and a vertical range of the viewport, respectively.

15. A video processing apparatus comprising:
a file decapsulation circuit, arranged to receive at least one ISO Base Media File Format (ISOBMFF) file, and decapsulate said at least one ISOBMFF file into a part of a coded bitstream, wherein virtual reality (VR) content is delivered by said at least one ISOBMFF file, said at least one ISOBMFF file comprises a first parameter, a second parameter, and a third parameter associated with orientation of a viewport, with the first, second and third parameters indicating a yaw angle, a pitch angle and a roll angle of a center of the viewport, respectively, and the first, second and third parameters are parsed from said at least one ISOBMFF file;
a video decoder, arranged to decode the part of the coded bitstream to obtain decoded data of a viewport; and
a post-processing circuit, arranged to render and display the viewport on a display screen according to the decoded data of the viewport, wherein the at least one ISOBMFF file further comprises a fourth parameter and a fifth parameter, the fourth and fifth parameters indicating a horizontal range of the viewport and a vertical range of the viewport, respectively.

* * * * *